US012704868B2

(12) United States Patent
Harmon

(10) Patent No.: US 12,704,868 B2
(45) Date of Patent: Aug. 11, 2026

(54) VEHICLE PEDAL ASSEMBLY FOR LEFT FOOT BRAKING

(71) Applicant: Ford Global Technologies, LLC, Dearborn, MI (US)

(72) Inventor: Michael John Harmon, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/897,610

(22) Filed: Sep. 26, 2024

(65) Prior Publication Data

US 2026/0086594 A1 Mar. 26, 2026

(51) Int. Cl.
*G05G 1/40* (2008.04)
*G05G 1/44* (2008.04)

(52) U.S. Cl.
CPC ................. *G05G 1/40* (2013.01); *G05G 1/44* (2013.01)

(58) Field of Classification Search
None
See application file for complete search history.

(56) References Cited

U.S. PATENT DOCUMENTS 4,454,497 A 6/1984 Morse
6,298,745 B1 * 10/2001 Rixon ................... B60T 8/3255 74/514
6,450,061 B1 * 9/2002 Chapman ............... G05G 1/405 74/513
12,391,115 B2 * 8/2025 Conigliaro ............... B62D 1/18
2023/0056163 A1 * 2/2023 Kim ......................... B60T 7/065

FOREIGN PATENT DOCUMENTS

JP 2008269025 A 11/2008
JP 2012106708 A 6/2012
JP 2013230737 A 11/2013
WO 2021194122 A1 9/2021

* cited by examiner

*Primary Examiner* — Vicky A Johnson
(74) *Attorney, Agent, or Firm* — Burr & Forman; Lorne Forsythe

(57) ABSTRACT

A pedal assembly for providing operational inputs to a vehicle may include a first pedal which may include a first pedal arm and a first pedal pad and may be operably coupled to a powertrain of the vehicle, and a second pedal which may include a second pedal arm and a second pedal pad and may be operably coupled to a brake assembly of the vehicle. The pedal assembly may be adjustable between a first state in which the pedal assembly may be arranged for one-footed operation, and a second state in which the pedal assembly may be arranged for two-footed operation.

19 Claims, 29 Drawing Sheets

VEHICLE PEDAL ASSEMBLY FOR LEFT FOOT BRAKING

TECHNICAL FIELD

Example embodiments generally relate to a pedal assembly for operating a vehicle and, more particularly, relate to a pedal assembly for left foot braking.

BACKGROUND

Left foot braking is a driving technique used in specific vehicle operating scenarios such as off-roading. Essentially, left foot braking is when the operator of the vehicle actuates the brake pedal with their left foot, which may offer a few benefits over the more traditional right foot braking technique. In this regard, by using left foot braking, the transition from moving to braking may be smoother and quicker, and the weight transfer of the vehicle during the transition from moving to braking may be smoother as well. Accordingly, in some cases, it may be desirable to develop a pedal assembly for a vehicle that may enhance a left foot braking experience for the operator of the vehicle.

BRIEF SUMMARY OF SOME EXAMPLES

In accordance with an example embodiment, a pedal assembly for providing operational inputs to a vehicle may therefore be provided. The pedal assembly may include a first pedal which may include a first pedal arm and a first pedal pad and may be operably coupled to a powertrain of the vehicle, and a second pedal which may include a second pedal arm and a second pedal pad and may be operably coupled to a brake assembly of the vehicle. The second pedal arm may be operably coupled to a linear actuator assembly. The linear actuator assembly may laterally displace the second pedal between a first position in which the second pedal may be disposed proximate to the first pedal, and a second position in which the second pedal may be disposed further away from the first pedal than the first position.

In accordance with another example embodiment, a pedal assembly for providing operational inputs to a vehicle may therefore be provided. The pedal assembly may include a first actuation assembly operably coupled to a powertrain of the vehicle and a second actuation assembly operably coupled to a brake assembly of the vehicle. The first actuation assembly may include a first engagement portion having a first surface area. The second actuation assembly may include a second engagement portion having a second surface area. The second actuation assembly may be configurable in a first state and a second state. The second surface area may be larger in the second state than in the first state.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
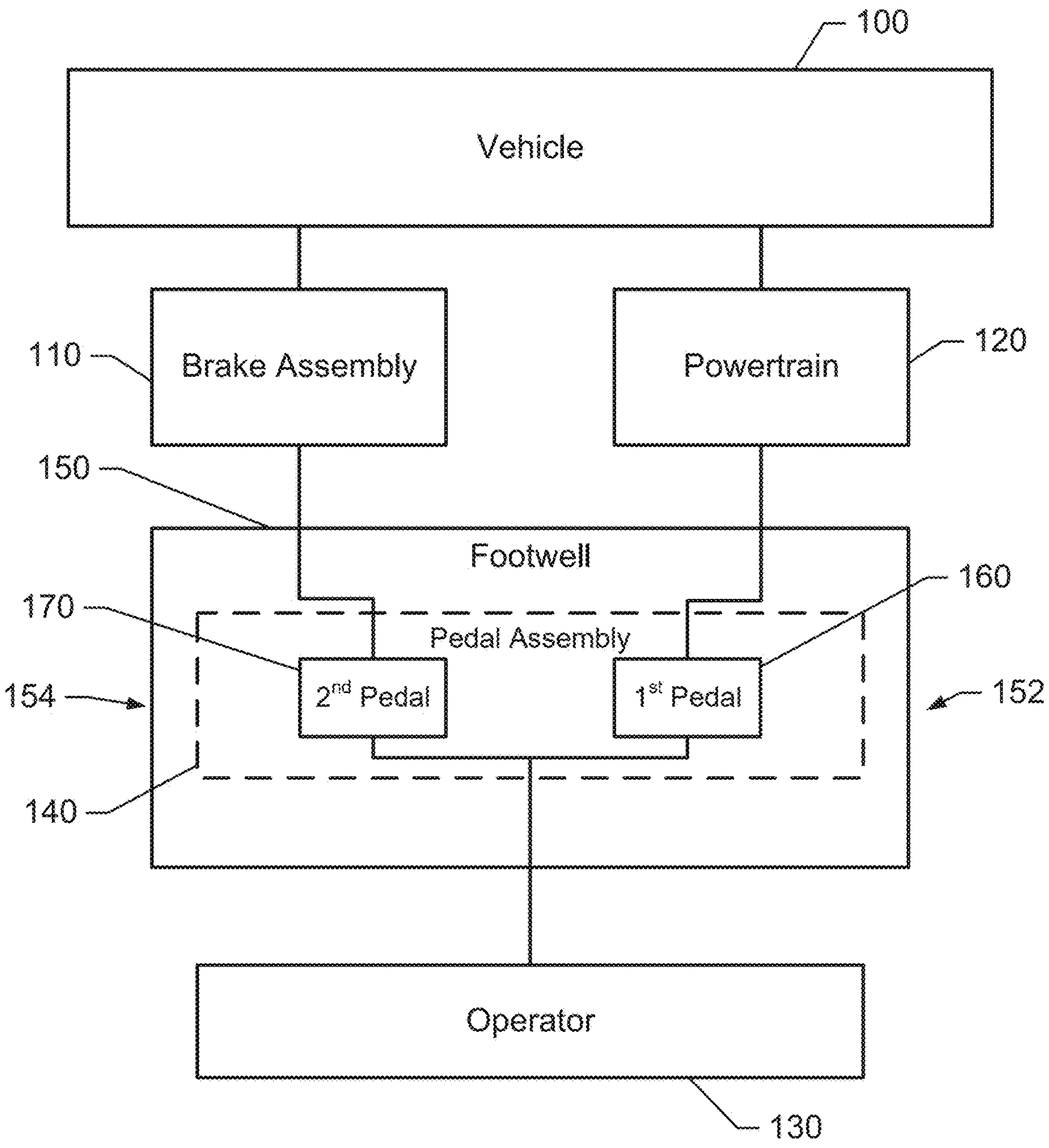
FIG. 1 illustrates a block diagram of a vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Additionally, as used herein, terminology such as "about," "approximately" and "substantially," when used to refer to variability of parameters, should be understood to be definite approximations that account for variations in measurements that cannot be, or as one of skill in the art would appreciate, normally are not, measured precisely. Thus, for example, a parameter that is "about," "approximately" or "substantially" a given value or a given characteristic should be understood to be sufficiently close to the given value or given characteristic such that performance of the object or product to which the parameter applies, from the perspective of one with ordinary skill in the art, is the same as though the object or product had precisely the given value or characteristic.

To enhance a left foot braking experience for the operator of the vehicle, some non-limiting examples may include a pedal assembly that may be adjustable between a first state and a second state. The first state may correspond to normal/everyday driving in which the operator may actuate first and second pedals with their right foot only, whereas the second state may enhance the operator's experience utilizing left foot braking. In some cases, the actuation of the pedal assembly in the first state may be referred to as normal, right-footed, single-footed, one-footed, etc., whereas the actuation of the pedal assembly in the second state may be referred to as left-footed, double-footed, two-footed, etc. Some non-limiting examples may make left foot braking more desirable, thus enhancing the operator's experience utilizing left foot braking.

FIG. 1 illustrates a block diagram of a vehicle 100 in accordance with an example embodiment. As shown in FIG. 1, the vehicle 100 may include, among other components, a brake assembly 110 and a powertrain 120. The brake assembly 110 and powertrain 120 may both be operably coupled to wheels (not shown) of the vehicle 100 to influence the movement of the vehicle 100. In this regard, the powertrain 120 may power the wheels to move the vehicle 100, whereas the brake assembly 110 may apply a stopping force to the wheels to slow or stop the vehicle 100 or to hold the vehicle 100 in place. The operator 130 of the vehicle 100 may provide operational inputs to both of the brake assembly 110 and the powertrain 120 via a pedal assembly 140 to operate the vehicle 100 as desired. The pedal assembly 140 may be disposed in a footwell 150 of the vehicle 100, proximate to the operator 130 when the operator 130 is in a position to operate the vehicle 100. In some cases, the pedal assembly 140 may include a first pedal 160 operably coupled to the powertrain 120, and a second pedal 170 operably coupled to the brake assembly 110. In an example embodiment, the operational input may be an actuation of the first pedal 160 or the second pedal 170. Thus, responsive to the operator 130 actuating the first pedal 160, the powertrain 120 may supply power to the wheels which may then rotate and move the vehicle 100. On the other hand, responsive to the operator 130 actuating the second pedal 170, the brake assembly 110 may apply a stopping force to the wheels which may then reduce the rate of rotation of the wheels to slow and stop the vehicle 100.

As mentioned above, the pedal assembly 140 may be disposed in a footwell 150 of the vehicle 100. The footwell 150 may also be where the operator 130 may rest their feet while they are in position to operate the vehicle 100. In some cases, the footwell 150 may include a first sidewall 152 and a second sidewall 154 which may be disposed substantially parallel to each other on opposing sides of the pedal assembly 140, as shown in FIG. 1. The first sidewall 152 and the second sidewall 154 may define a width of the footwell 150 extending therebetween. In many current implementations, the first pedal 160 may be disposed proximate to the first sidewall 152, while the second pedal 170 may be disposed on an opposite side of the first pedal 160 from the first sidewall 152, but still closer to the first pedal 160 than to the second sidewall 154. This layout of the first and second pedals (160, 170) of the pedal assembly 140 may make it less desirable for the operator 130 of the vehicle 100 to use the left foot braking technique described above. Accordingly, in some cases, the pedal assembly 140 may be modified to enhance operator 130 experience.

Figure 2:
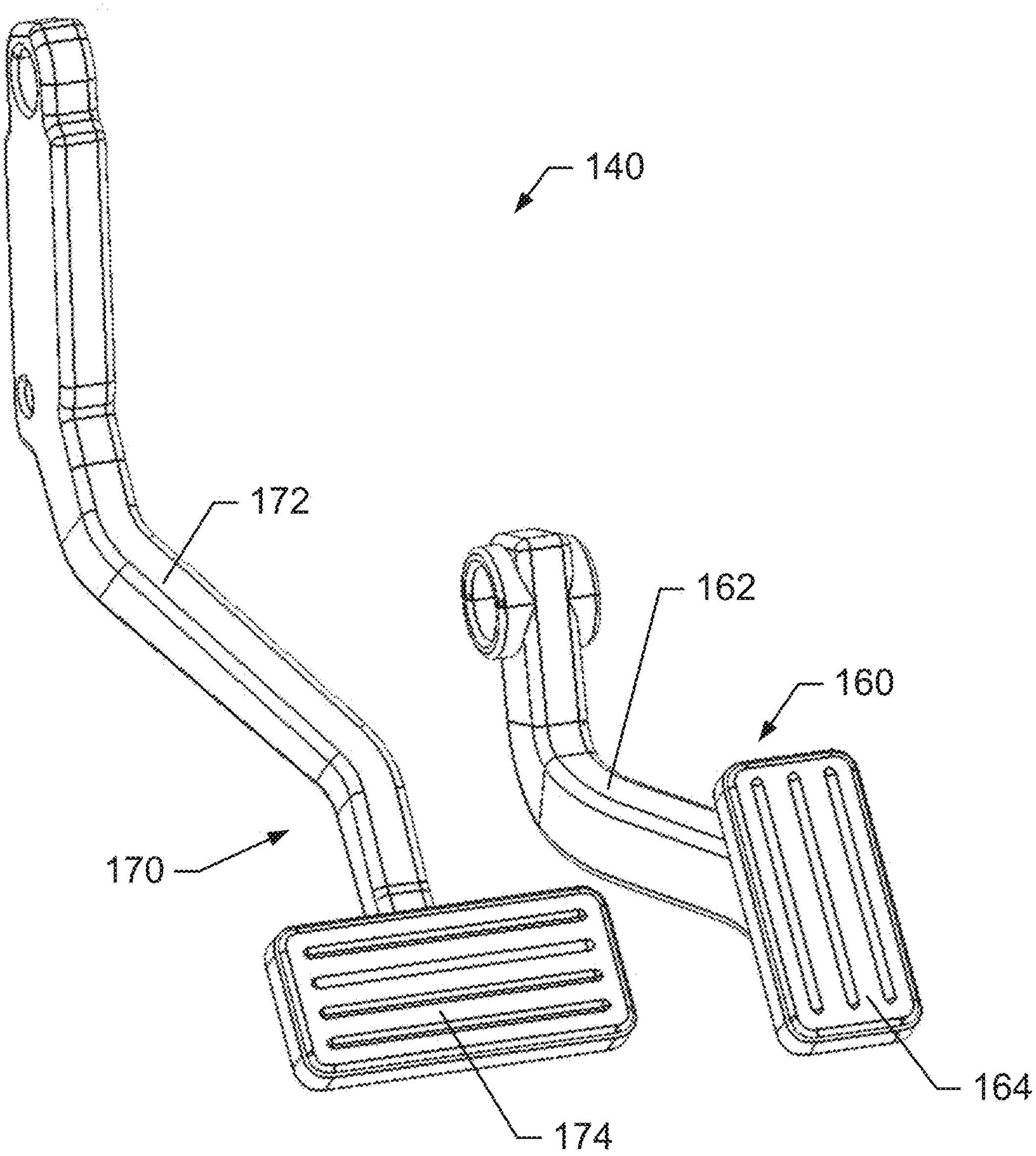
FIG. 2 illustrates a perspective view of a pedal assembly in a first state in accordance with an example embodiment.

FIG. 2 depicts the pedal assembly 140 according to an example embodiment. As mentioned above, the pedal assembly 140 may include a first pedal 160 and a second pedal 170. The first pedal 160 may be operably coupled to the powertrain 120 to control the supply of power to the wheels while the second pedal 170 may be operably coupled to the brake assembly 110 to control the application of the stopping force to the wheels. The first pedal 160 may include a first pedal arm 162 rotatably operably coupled to the vehicle 100 at a first end of the first pedal arm 162 and a first pedal pad 164 disposed at a second end of the first pedal arm 162. Similarly, the second pedal 170 may include a second pedal arm 172 rotatably operably coupled to the vehicle 100 at a first end of the second pedal arm 172 and a second pedal pad 174 disposed at a second end of the second pedal arm 172. In some cases, the operator 130 may actuate the first and second pedals (160, 170) by applying a force onto the first and second pedal pads (164, 174) to rotate the first and second pedals (160, 170) about their respective rotatable operable couplings to the vehicle 100 at distal ends of the first and second pedal arms (162, 172), respectively. The pedal assembly of FIG. 2 may be shown in the first state, which, as explained above, may correspond to right-footed operation of the pedal assembly 140.

FIGS. 3-7 illustrate various views of the pedal assembly 140 in accordance with an example embodiment. In the embodiment depicted in FIGS. 3-7, the pedal assembly 140 may further include a linear actuator assembly 180 which may move the second pedal 170 away from the first pedal 160. In this regard, the linear actuator assembly 180 may include a lead screw 182 disposed horizontally between the first sidewall 152 and the second sidewall 154 of the footwell 150 in which the pedal assembly 140 is disposed, and a motor 184 operably coupled to the lead screw 182 which may rotate the lead screw 182. The linear actuator assembly 180 may therefore support at least the second pedal 170 and may operably couple the second pedal 170 to the vehicle 100. In some cases, the lead screw 182 may be operably coupled to the footwell 150 at first and second ends of the lead screw 182. In some other cases, the lead screw 182 may be cantilevered into the footwell 150 from one of the first or second sidewalls (152, 154) and may not operably couple to the other of the first and second sidewalls (152, 154). Similarly, in some cases, the motor 184 may only be disposed at the first end of the lead screw 182, proximate to the first pedal 160. In some other example embodiments, the motor 184 may be disposed at either of the first or second ends of the lead screw 182, or sometimes there may be a motor 184 disposed at both of the first and second ends of the lead screw 182. The motor 184 may be operably coupled to a power source and capable of rotating the lead screw 182 about an axis of rotation 186. The axis of rotation 186 may be disposed in the direction of motion of the second pedal 170. In other words, the second pedal 170 may move axially along the axis of rotation 186 responsive to the lead screw 182 being rotated about the axis of rotation 186 by the motor 184. The motor 184 of some example embodiments may rotate the lead screw 182 responsive to receiving an input from the operator 130 via a button or actuator or interface. In another example embodiment, the linear actuator assembly 180 may not include a motor 184 and instead the lead screw 182 may be manually rotated about the axis of rotation 186. The lead screw 182 may be rotated either by hand, by a crank arm, or by other similar mediums for rotation.

Figure 3:
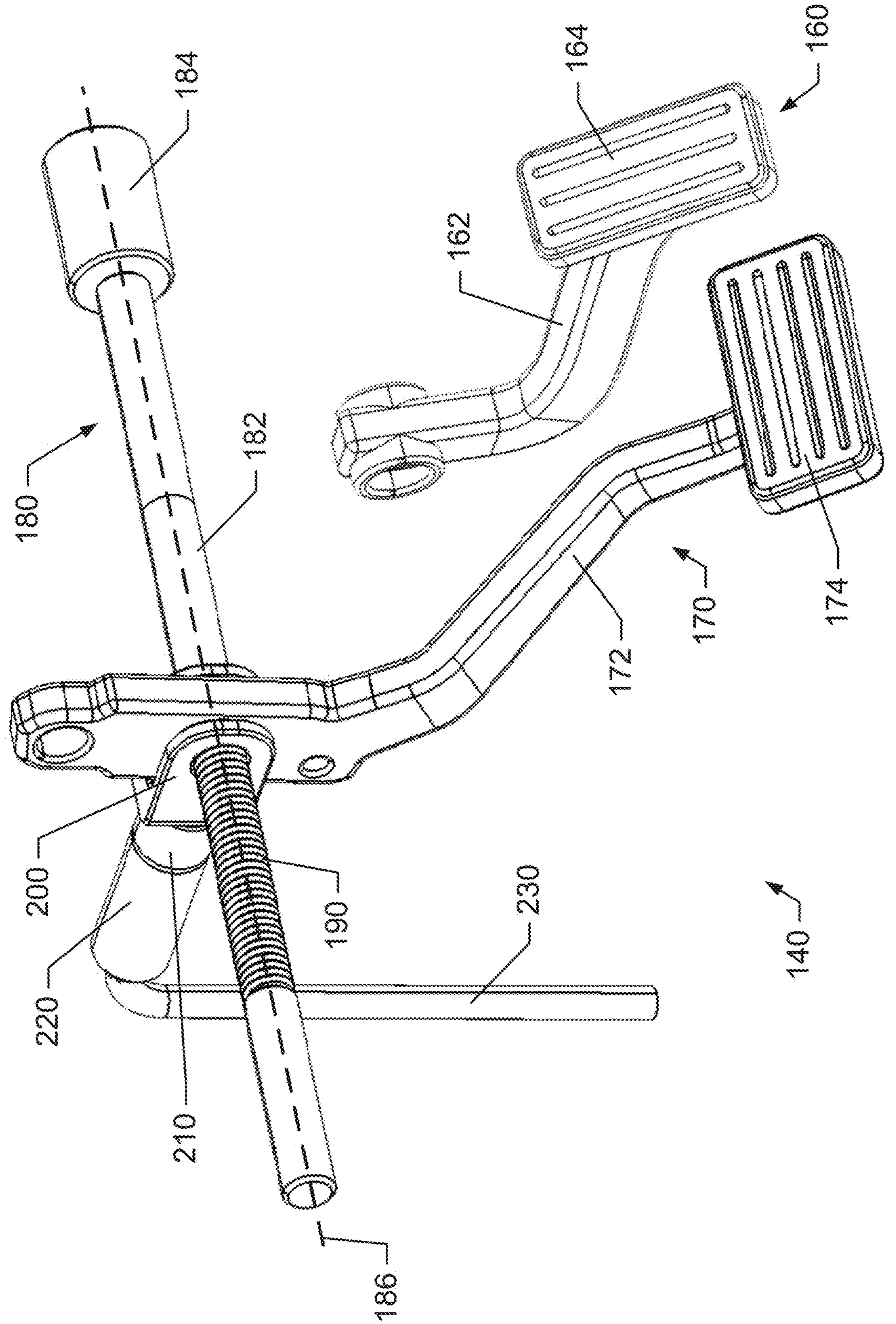
FIG. 3 illustrates a perspective view of the pedal assembly in the first state in accordance with an example embodiment.
Figure 5:
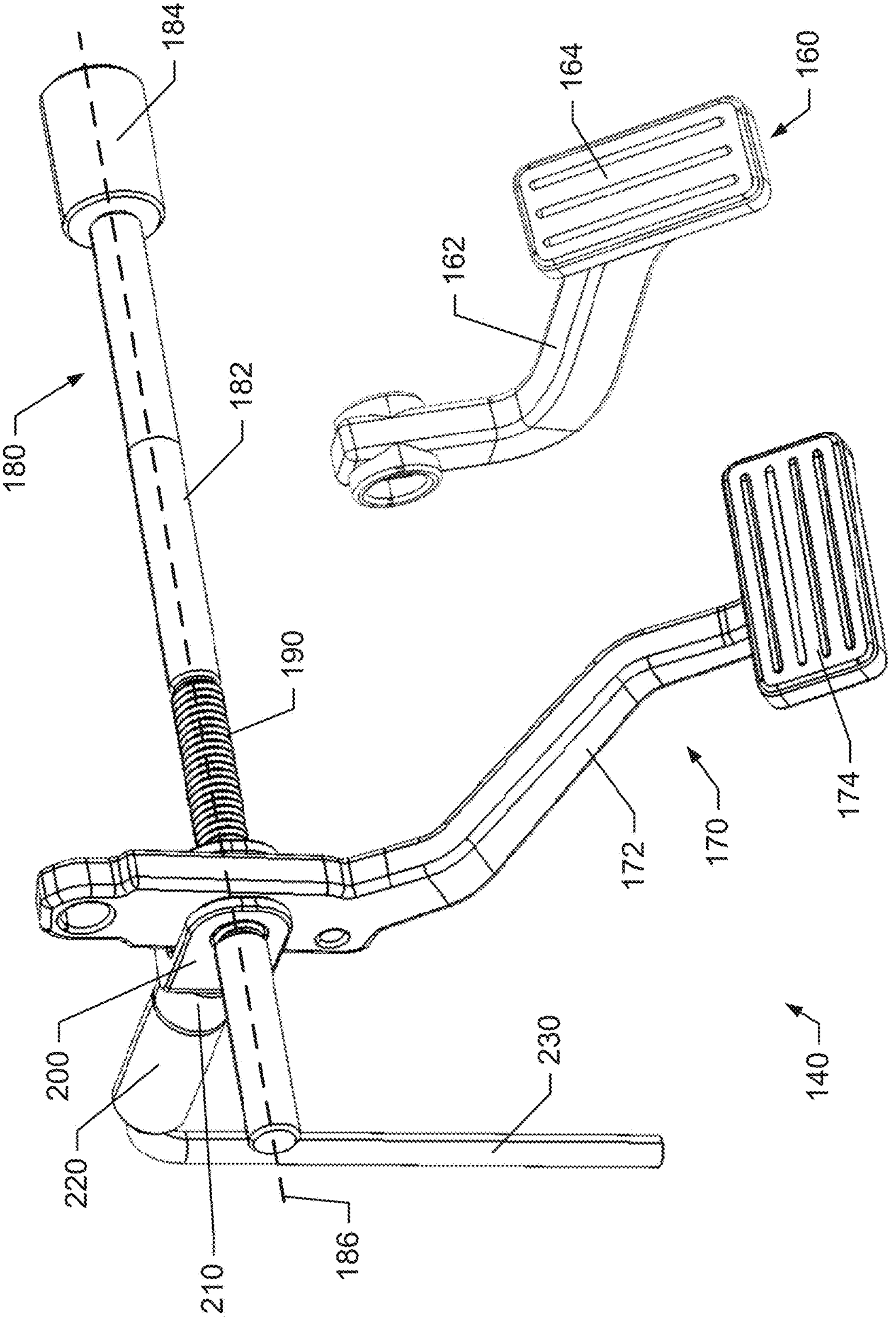
FIG. 5 illustrates a perspective view of the pedal assembly in a second state in accordance with an example embodiment.

Regardless of how the lead screw 182 may be actuated, the operator 130 may use the linear actuator assembly 180 to adjust a lateral position of the second pedal 170 as desired. This may occur as a result of the lead screw 182 including a thread assembly 190, and the second pedal 170 including a clevis bracket 200 that may be in threaded engagement with the thread assembly 190 to operably couple the second pedal arm 172 to the lead screw 182. Accordingly, rotation of the lead screw 182 (i.e. clockwise) may move the clevis bracket 200 axially along the thread assembly 190 of the lead screw 182 to carry the second pedal 170 from a first position proximate to the first pedal 160 (e.g. as depicted in FIG. 3) to a second position disposed further away from the first pedal 160 than the first position (e.g. as depicted in FIG. 5). On the other hand, rotation of the lead screw 182 in the opposite direction (i.e. counterclockwise) may necessarily move the second pedal 170 back to the first position from the second position. The first position of the second pedal 170 may correspond to the first state of the pedal assembly 140 and the second position of the second pedal 170 may correspond to the second state of the pedal assembly 140.

The clevis bracket 200 may also operably couple the second pedal arm 172 to the brake assembly 110. The brake assembly 110 may include a master cylinder, and typically the second pedal 170 may be operably coupled to the master cylinder via a pushrod. Responsive to the second pedal 170 being actuated, the pushrod may push a piston inside the master cylinder which may force brake fluid through the brake fluid lines to the brake calipers disposed at the wheels to apply the stopping force to the wheels. However, in the embodiment depicted in FIGS. 3-7 and as seen best in FIGS. 4 and 6, the brake assembly 110 may include a small piston 210, a local cylinder 220, and a first fluid line 230. Rather than be operably coupled directly to the master cylinder via the pushrod, the second pedal 170 may be operably coupled to the small piston 210 via the pushrod. The small piston 210 may be operably coupled to the second pedal 170 via the clevis bracket 200 and to the local cylinder 220. The local cylinder 220 may operably couple the small piston 210 to the first fluid line 230, which may fluidly couple the local cylinder 220 to the master cylinder. Accordingly, responsive to the second pedal 170 being actuated, the pushrod may push on the small piston 210, which via the local cylinder 220, may increase the fluid pressure in the first fluid line 230 to the master cylinder. From there, the master cylinder may force brake fluid through the brake fluid lines to the brake calipers disposed at the wheels to apply the stopping force to the wheels.

Figure 4:
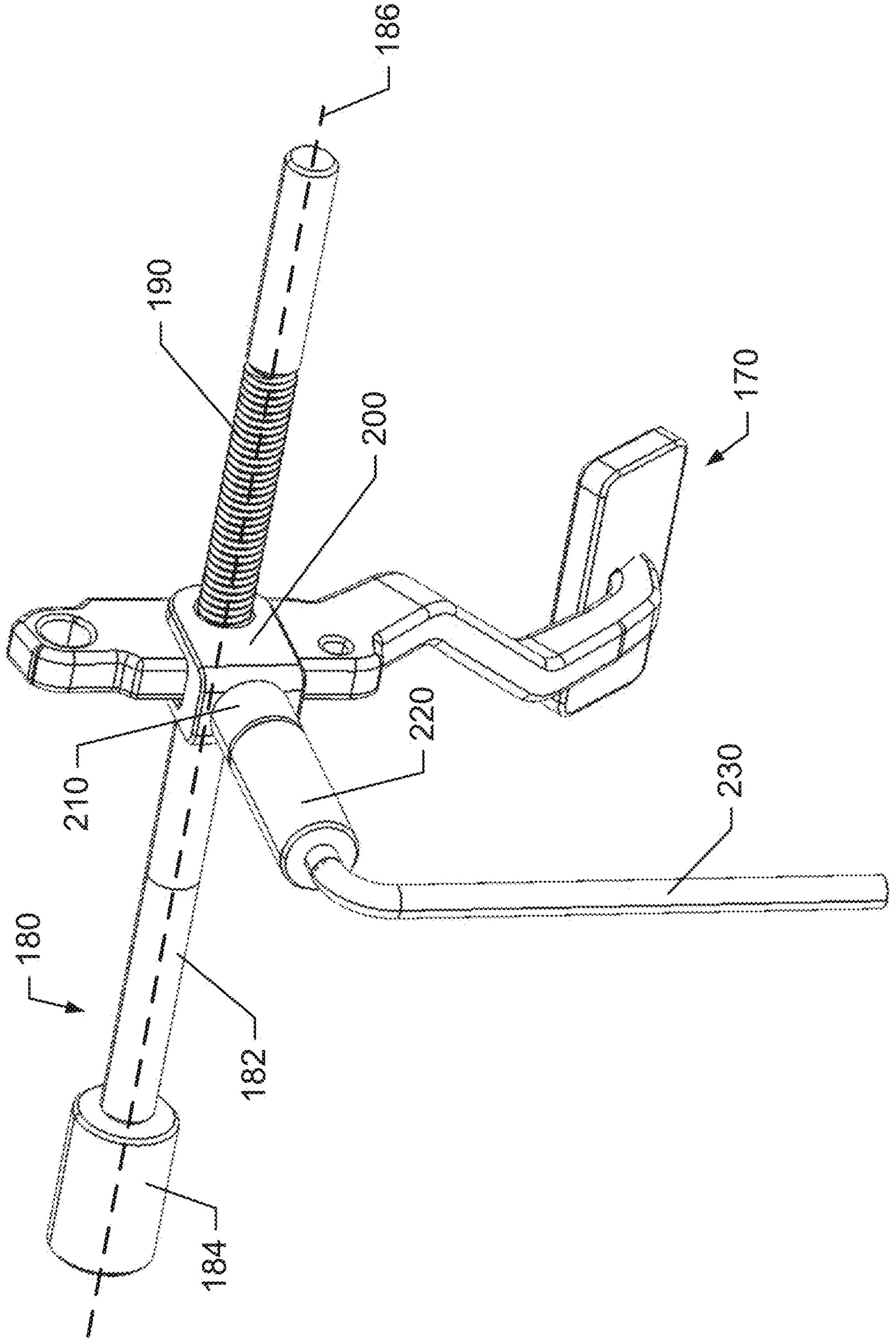
FIG. 4 illustrates a rear perspective view of a second pedal in the first state in accordance with an example embodiment.
Figure 6:
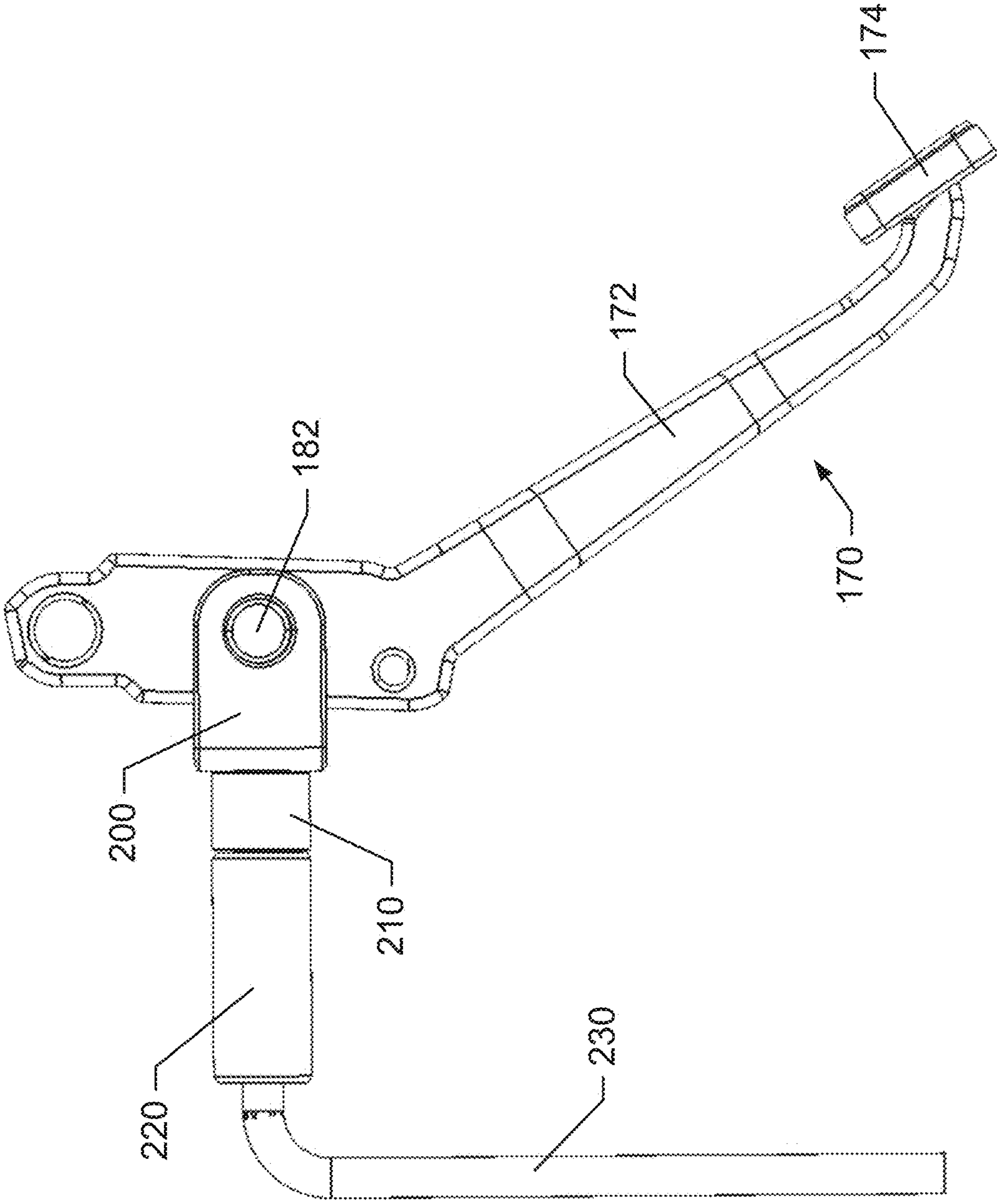
FIG. 6 illustrates a side view of the second pedal in accordance with an example embodiment.
Figure 7:
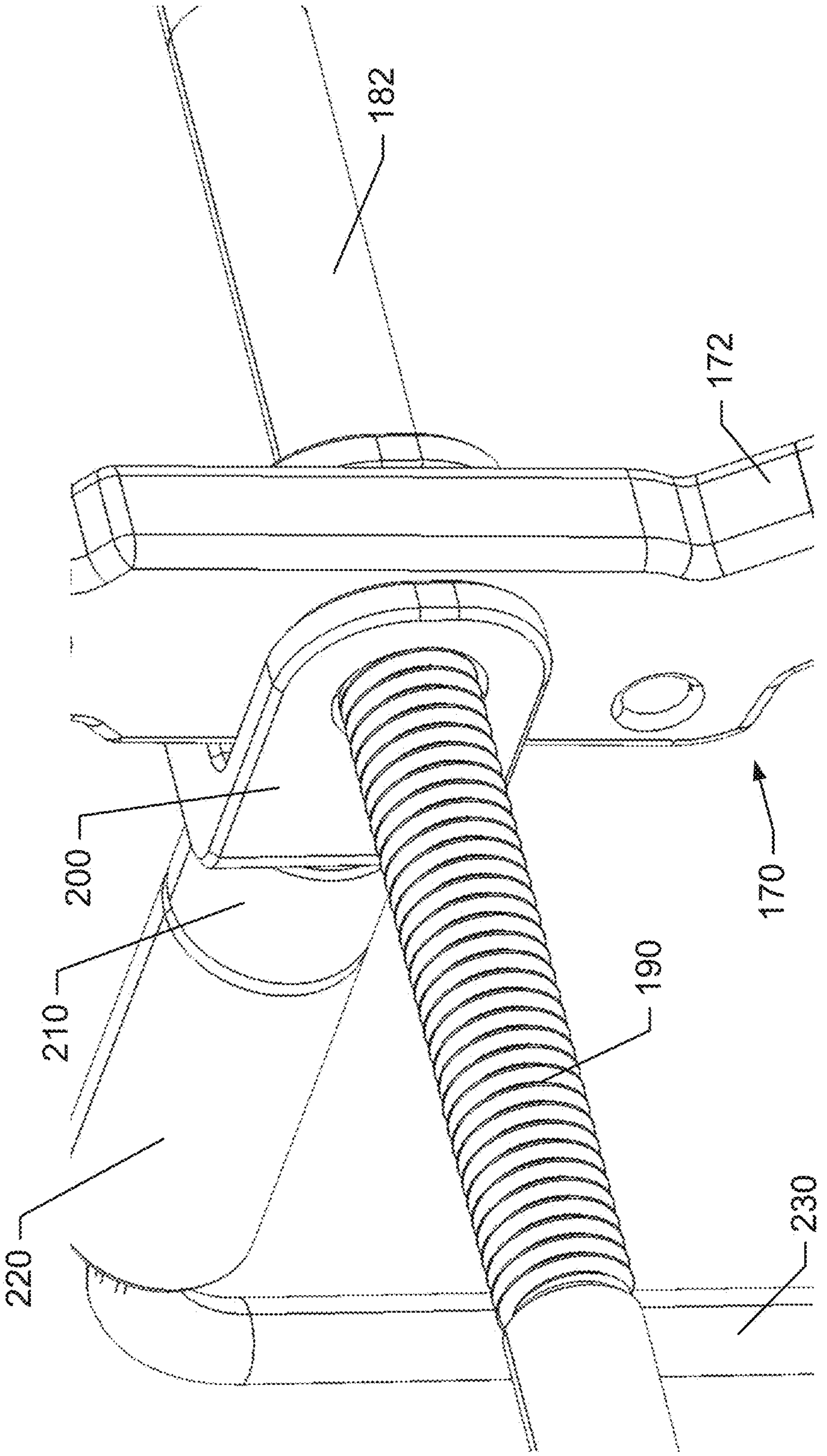
FIG. 7 illustrates a close up perspective view of the pedal assembly in accordance with an example embodiment.
Figure 8:
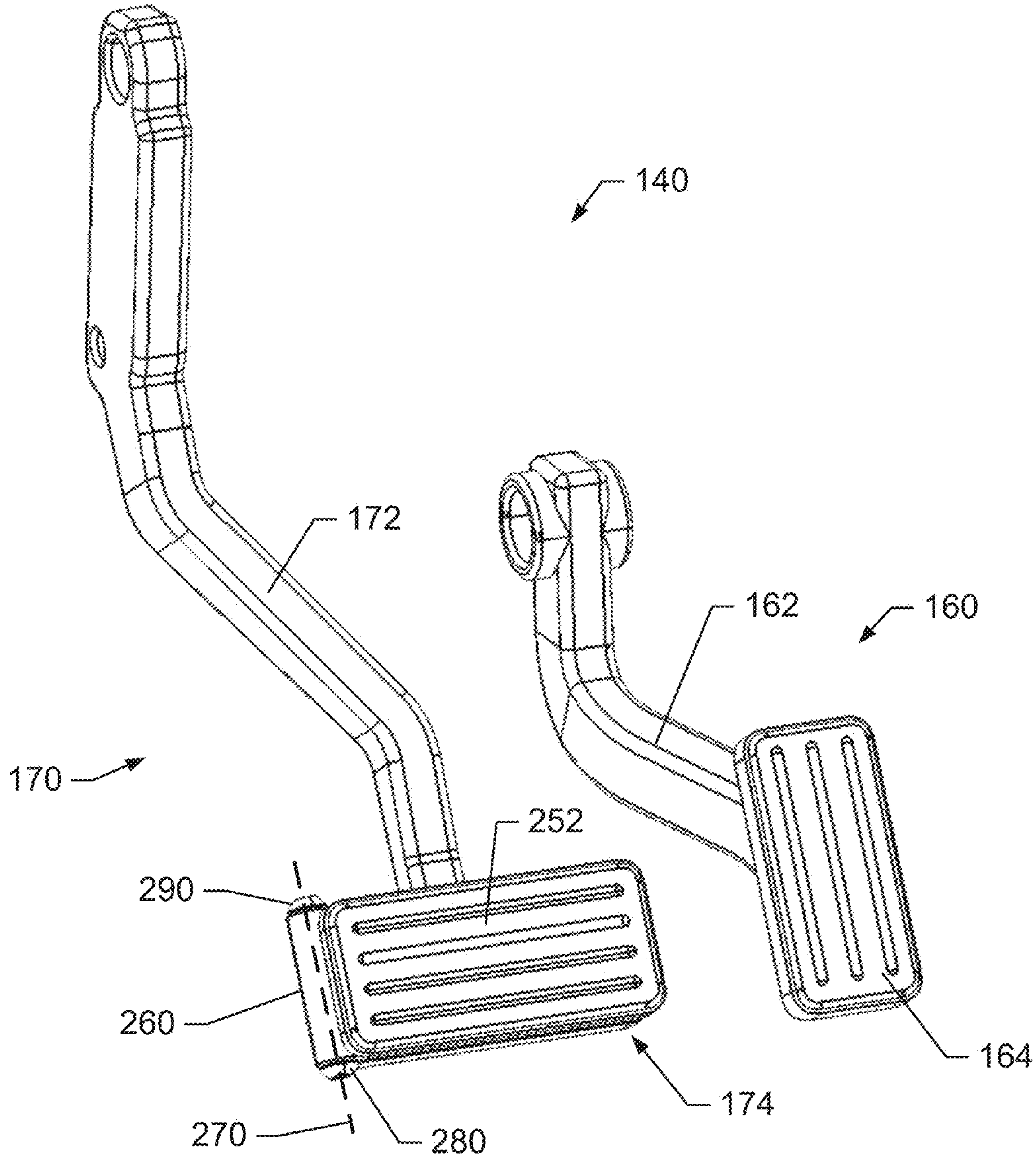
FIG. 8 illustrates a perspective view of the pedal assembly in the first state in accordance with an example embodiment.
Figure 9:
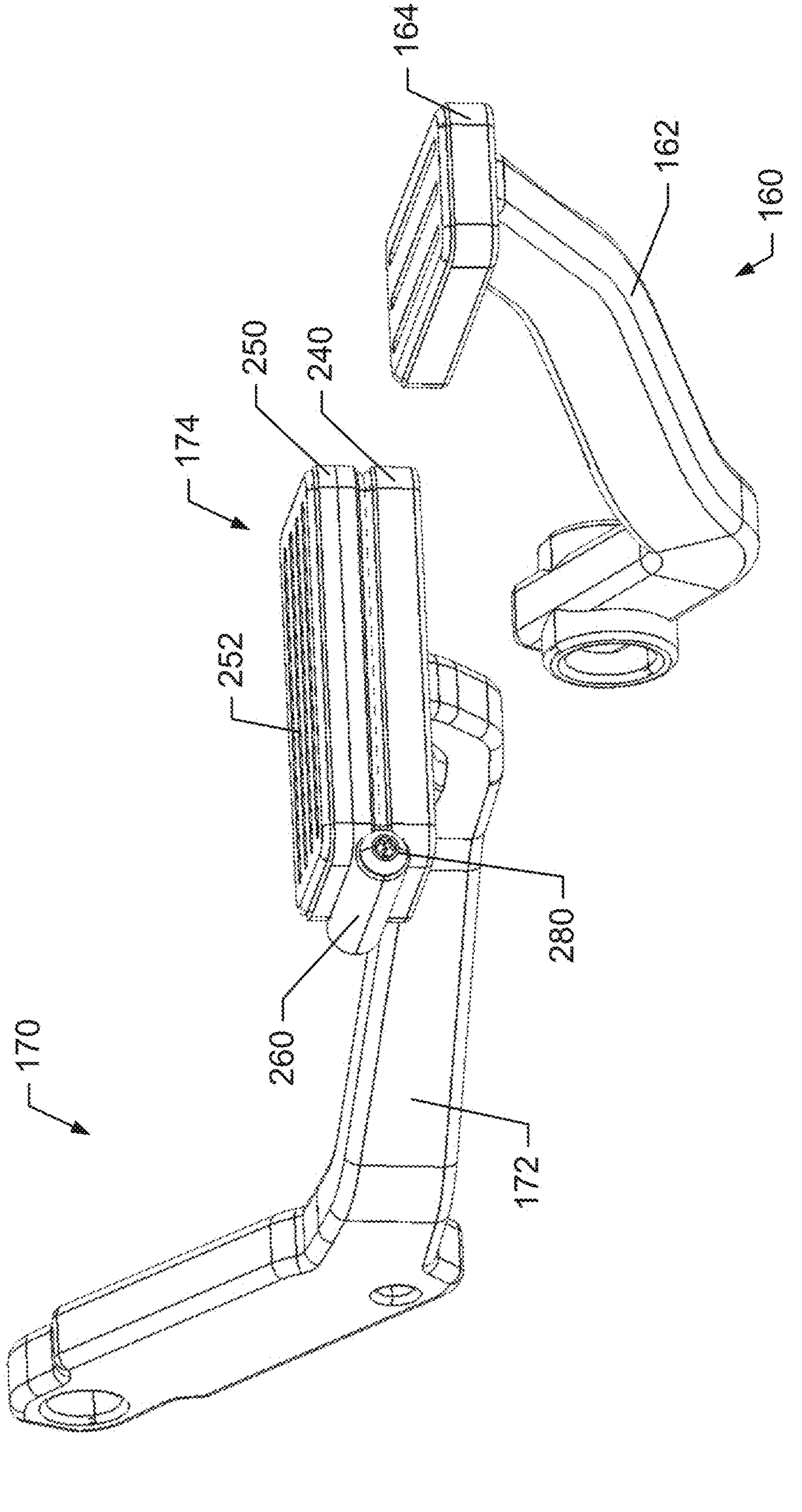
FIG. 9 illustrates a bottom perspective view of the pedal assembly in the first state in accordance with an example embodiment.

As shown in FIGS. 4 and 6, the small piston 210 and the local cylinder 220 may each be operably coupled to the clevis bracket 200. As such, the small piston 210 and the local cylinder 220 may be carried by the clevis bracket 200 from the first position to the second position and anywhere in between. Since the first fluid line 230 may be a flexible operable coupling between the second pedal 170 and the master cylinder, the first fluid line 230 may enable the second pedal 170 to be moved between the first and second positions without having to adjust any operable couplings between the pedal assembly 140 and the brake assembly 110. For example, if the second pedal 170 were operably coupled directly to the master cylinder via the pushrod, then the second pedal 170 would not be able to translate axially from the first position to the second position without also moving the master cylinder or adjusting the pushrod. Instead, according to the example embodiment depicted in FIGS. 3-7, the small piston 210 and local cylinder 220 may be carried by the clevis bracket 200 wherever the second pedal 170 moves.

In some cases, the thread assembly 190 of the lead screw 182 may extend for an entire length of the lead screw 182 from the first end to the second end. In an example embodiment, the thread assembly 190 may extend for greater than half the length of the lead screw 182, but less than the entire length. In still some other cases, such as the one depicted herein, the thread assembly 190 may extend for less than half the length of the lead screw 182. In some cases, the thread assembly 190 may also not extend to either of the first or second ends of the lead screw 182, and may instead be disposed along an intermediate portion of the lead screw 182. The length of the thread assembly 190 of the lead screw 182 may be dependent upon the size of the footwell 150 in which the lead screw 182 may be disposed, as well as the desired first and second positions of the second pedal 170.

In the embodiments depicted in FIGS. 8-29, the pedal assembly 140 may include a first actuation assembly which may be operably coupled to the powertrain 120 of the vehicle 100 and a second actuation assembly which may be operably coupled to the brake assembly 110 of the vehicle 100. In an example embodiment, the first actuation assembly may include at least the first pedal 160 and the second actuation assembly may include at least the second pedal 170. The first actuation assembly may further include a first engagement portion having a first surface area, and the second actuation assembly may include a second engagement portion having a second surface area. In an example embodiment, the first engagement portion may be the first pedal pad 164 and the second engagement portion may be the second pedal pad 174. In some cases, the second actuation assembly may be configurable in the first state of the pedal assembly 140 and in the second state of the pedal assembly 140. In an example embodiment, the second surface area may be larger in the second state than in the first state.

FIGS. 8-15 illustrate various views of the pedal assembly 140 in accordance with an example embodiment. In some example embodiments, the second pedal pad 174 may include a base portion 240 and a pivot portion 250. The base portion 240 may be fixedly operably coupled to the second pedal arm 172 and the pivot portion 250 may be rotatably operably coupled to the base portion 240. In this regard, the second pedal pad 174 may be rotatable between a closed position as shown in FIGS. 8-11, and an open position as shown in FIGS. 12-15. The pivot portion 250 may be rotatable relative to the base portion 240 between the closed position and the open position. In the closed position, the pivot portion 250 may be disposed on top of the base portion 240, and as such, the right foot of the operator 130 may come into contact with the pivot portion 250 responsive to actuating the second pedal 170. On the other hand, in the open position, the pivot portion 250 may be disposed in a same plane as the base portion 240, and as such, the second pedal 170 may be accessible by the operator 130 using left foot braking. Accordingly, the closed position may correspond to the first state of the pedal assembly 140 and the open position may correspond to the second state of the pedal assembly 140.

In some cases, the pivot portion 250 may have a same shape as the base portion 240 and a same area as the base portion 240. Thus, in the closed position, the perimeter of the base portion 240 may align with the perimeter of the pivot portion 250 without any overlap in the portions. Therefore, the actuatable surface area of the second pedal pad 174 may be approximately twice as large in the open position than the actuatable surface area of the second pedal pad 174 in the closed position. According to an example embodiment, the pivot portion 250 may include a textured pattern disposed on first and second surfaces (252, 254) on opposing sides of the pivot portion 250. In this regard, in the closed position, the first surface 252 of the pivot portion 250 may be exposed and facing the operator 130 and the second surface 254 of the pivot portion 250 may be in contact with the base portion 240. Conversely, in the open position, the first surface 252 may be facing away from the operator 130 and the second surface 254 may be facing the operator 130 along with a third surface 242 disposed at the base portion 240. Accordingly, the first surface 252, the second surface 254, and the third surface 242 may each include the textured pattern to give the second pedal pad 174 better grip during actuation by the operator 130, depending on the particular configuration state of the pedal assembly 140.

Figure 10:
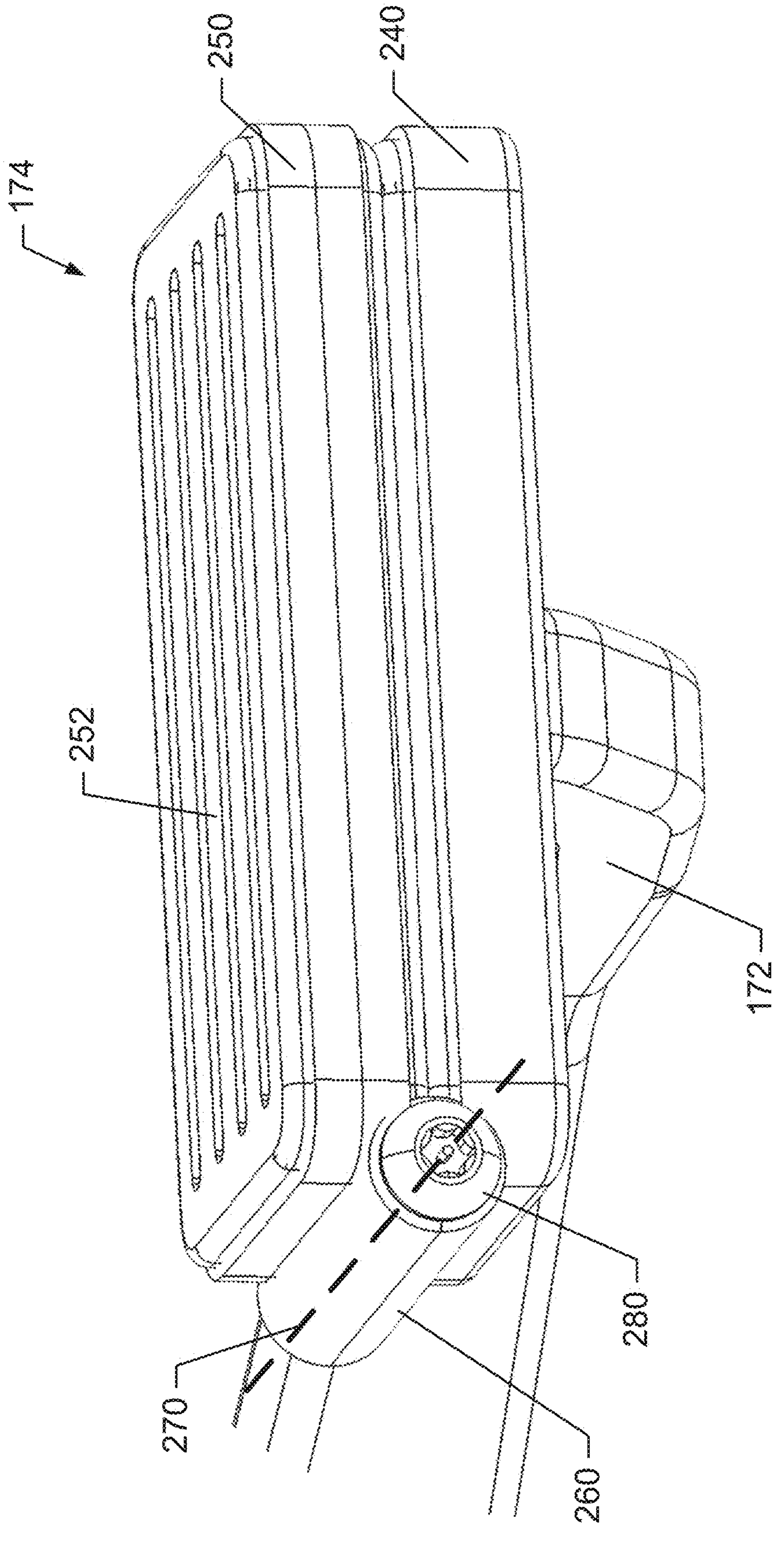
FIG. 10 illustrates a close up bottom perspective view of the second pedal in the first state in accordance with an example embodiment.
Figure 11:
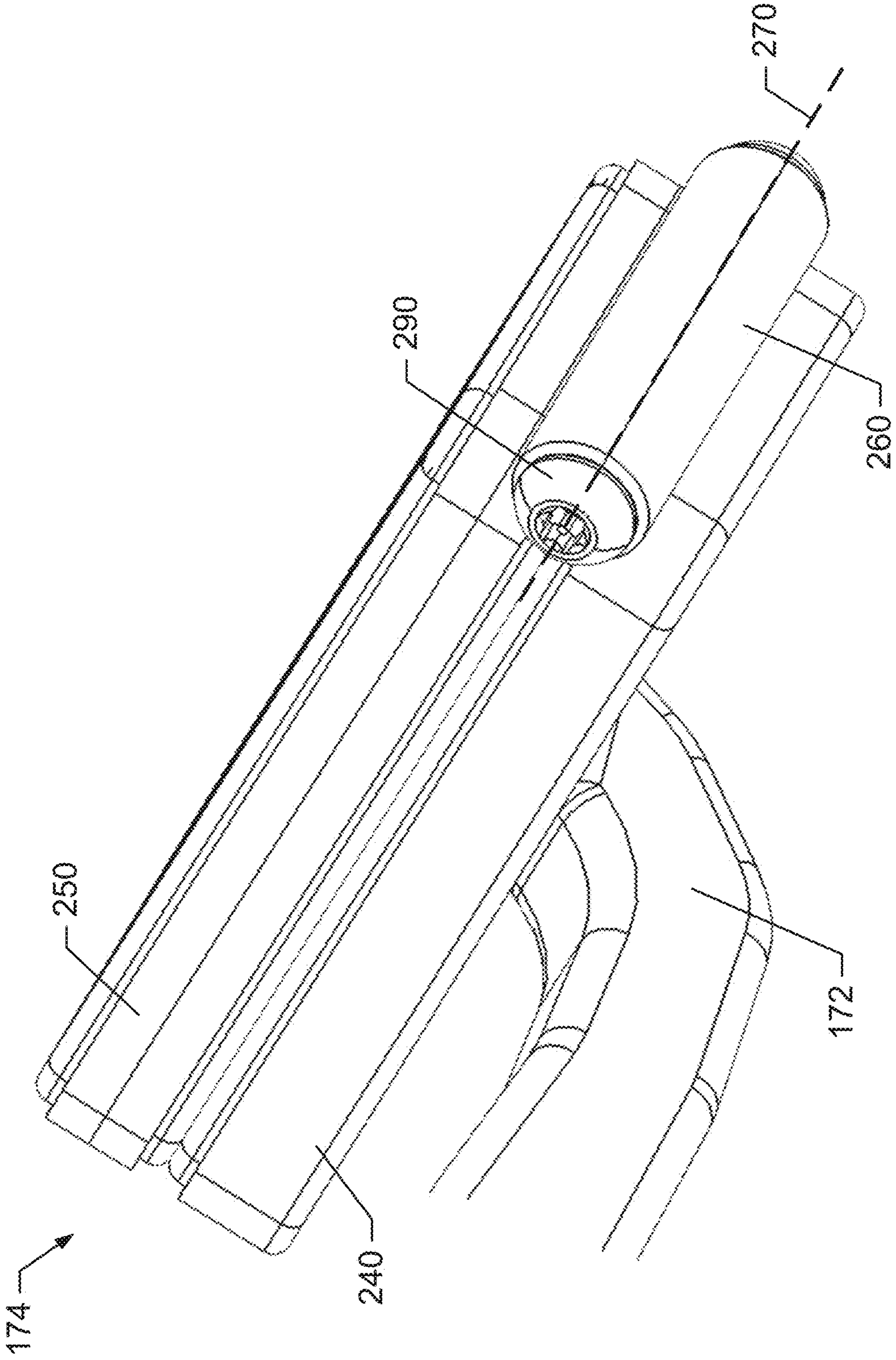
FIG. 11 illustrates a top perspective view of the second pedal in the first state in accordance with an example embodiment.
Figure 12:
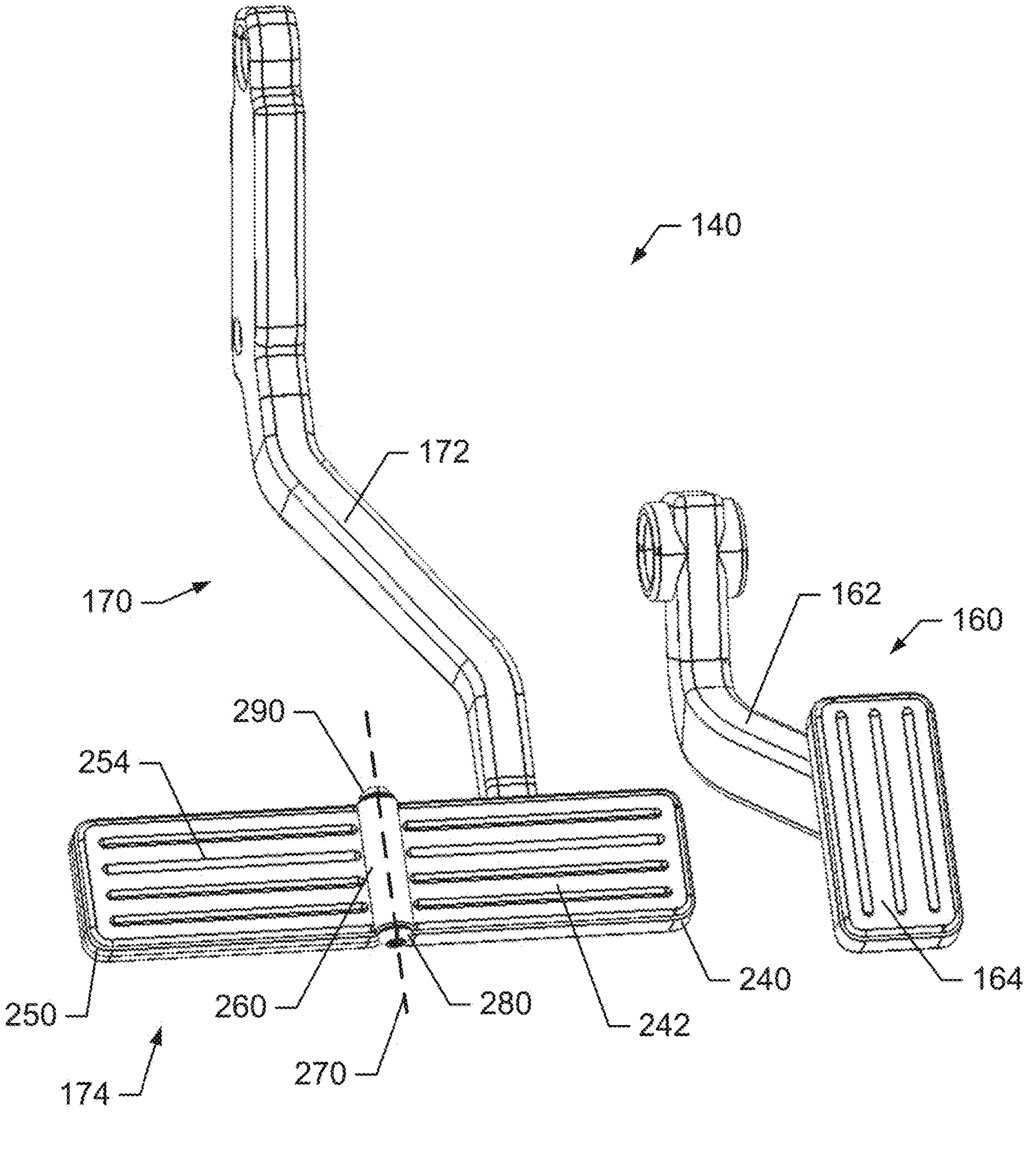
FIG. 12 illustrates a perspective view of the pedal assembly in the second state in accordance with an example embodiment.
Figure 13:
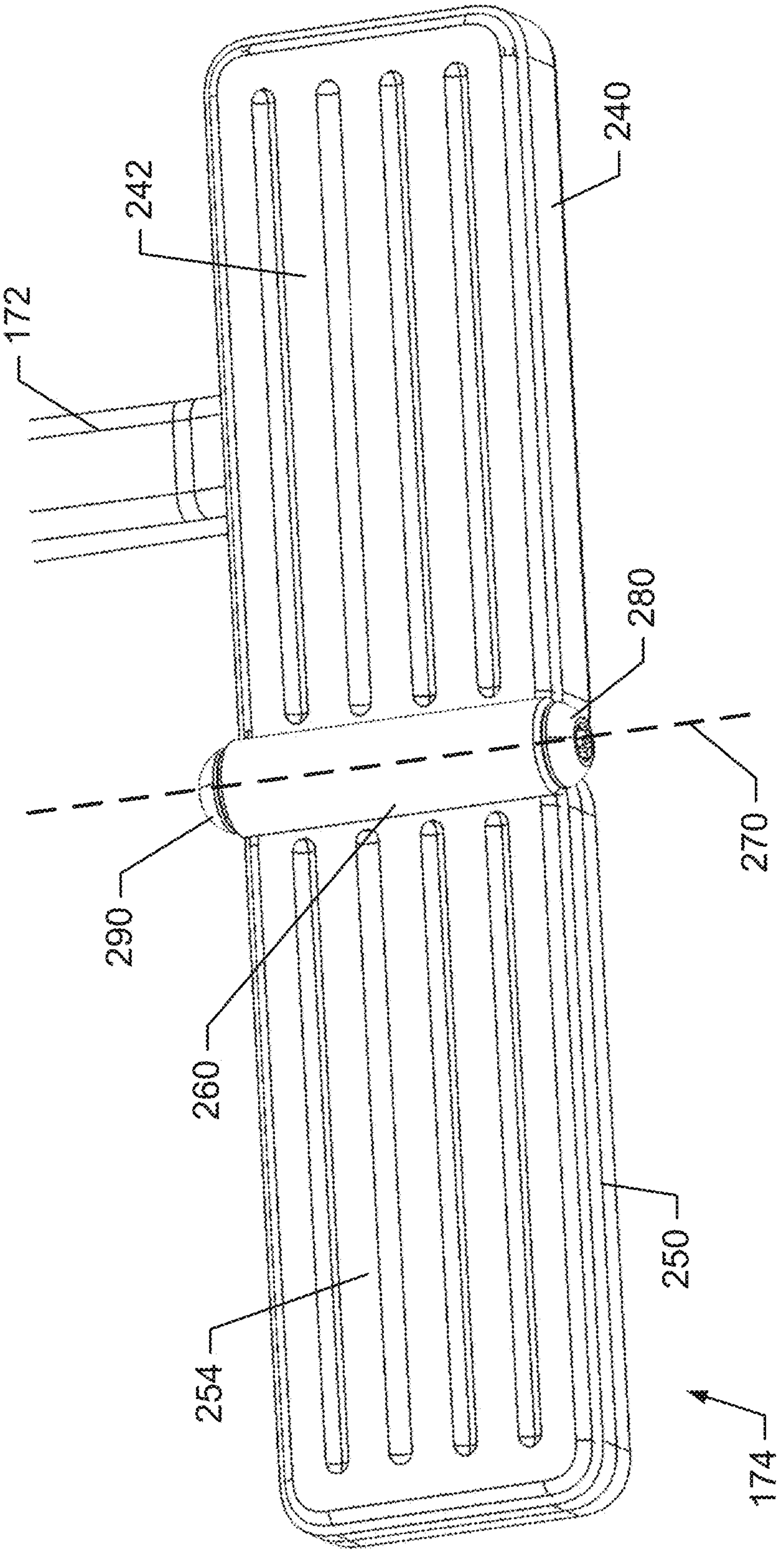
FIG. 13 illustrates a close up perspective view of the second pedal in the second state in accordance with an example embodiment.
Figure 14:
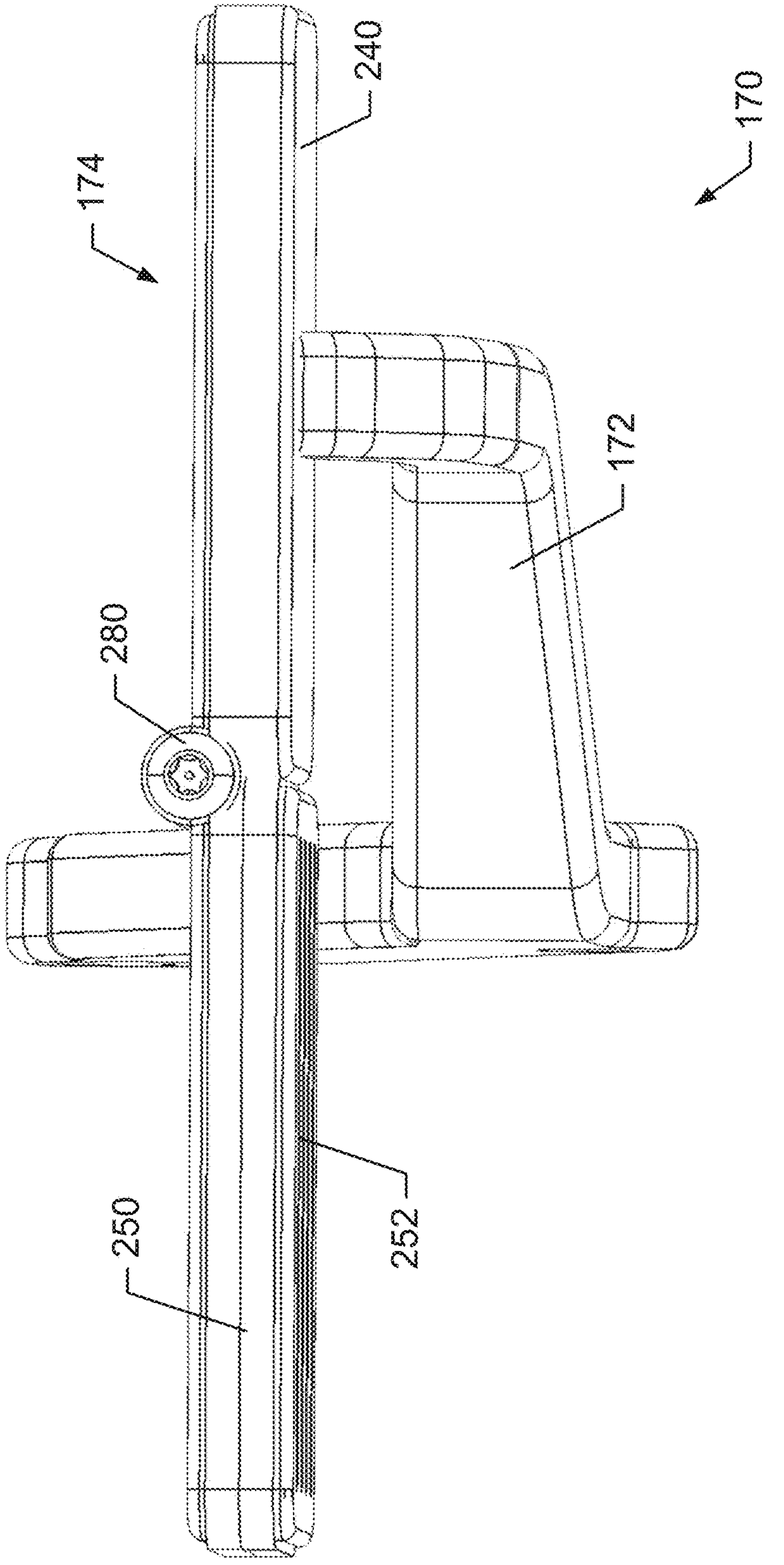
FIG. 14 illustrates a close up bottom perspective view of the second pedal in the second state in accordance with an example embodiment.
Figure 15:
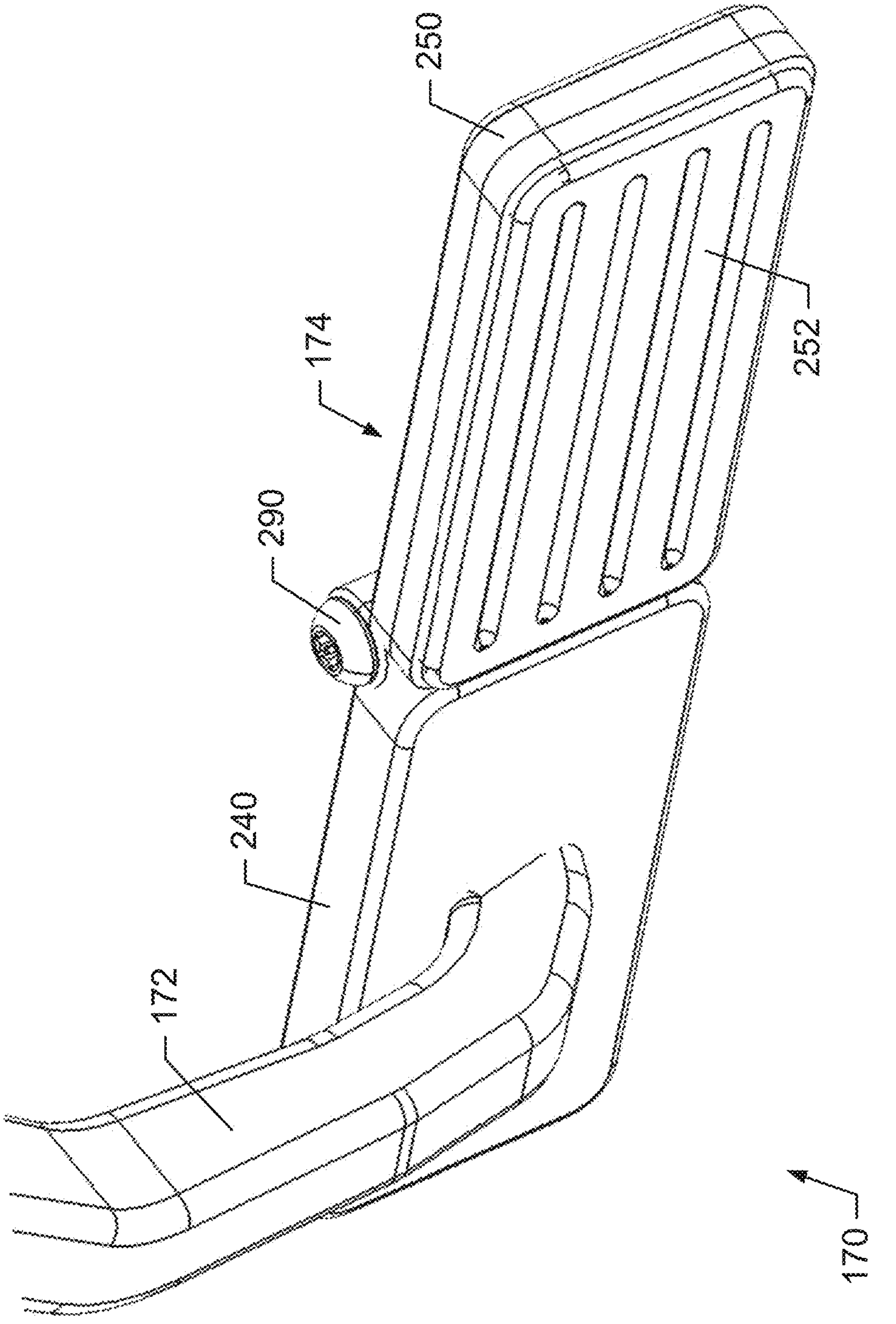
FIG. 15 illustrates a top perspective view of the second pedal in the second state in accordance with an example embodiment.
Figure 16:
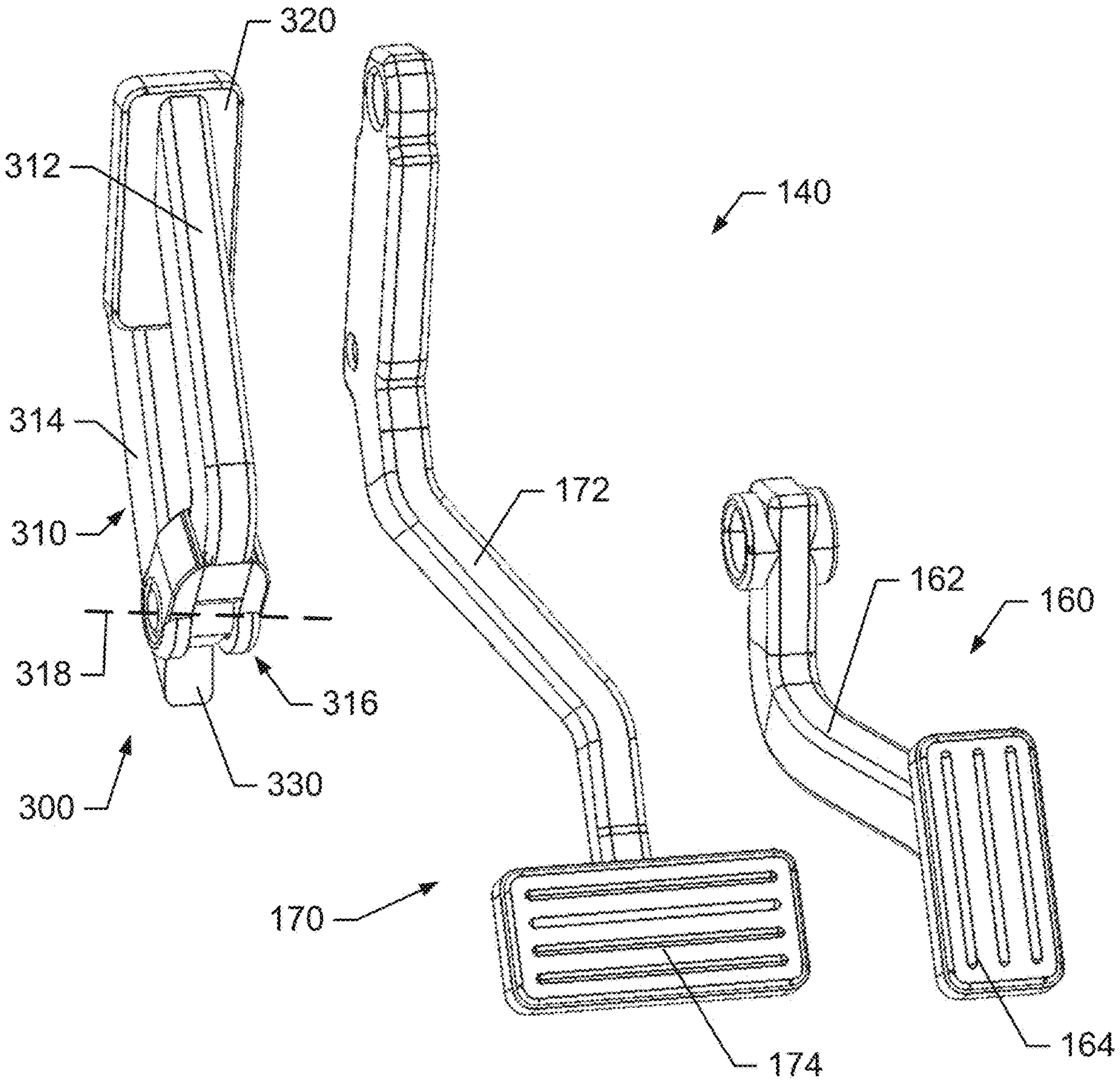
FIG. 16 illustrates a perspective view of the pedal assembly in the first state in accordance with an example embodiment.
Figure 17:
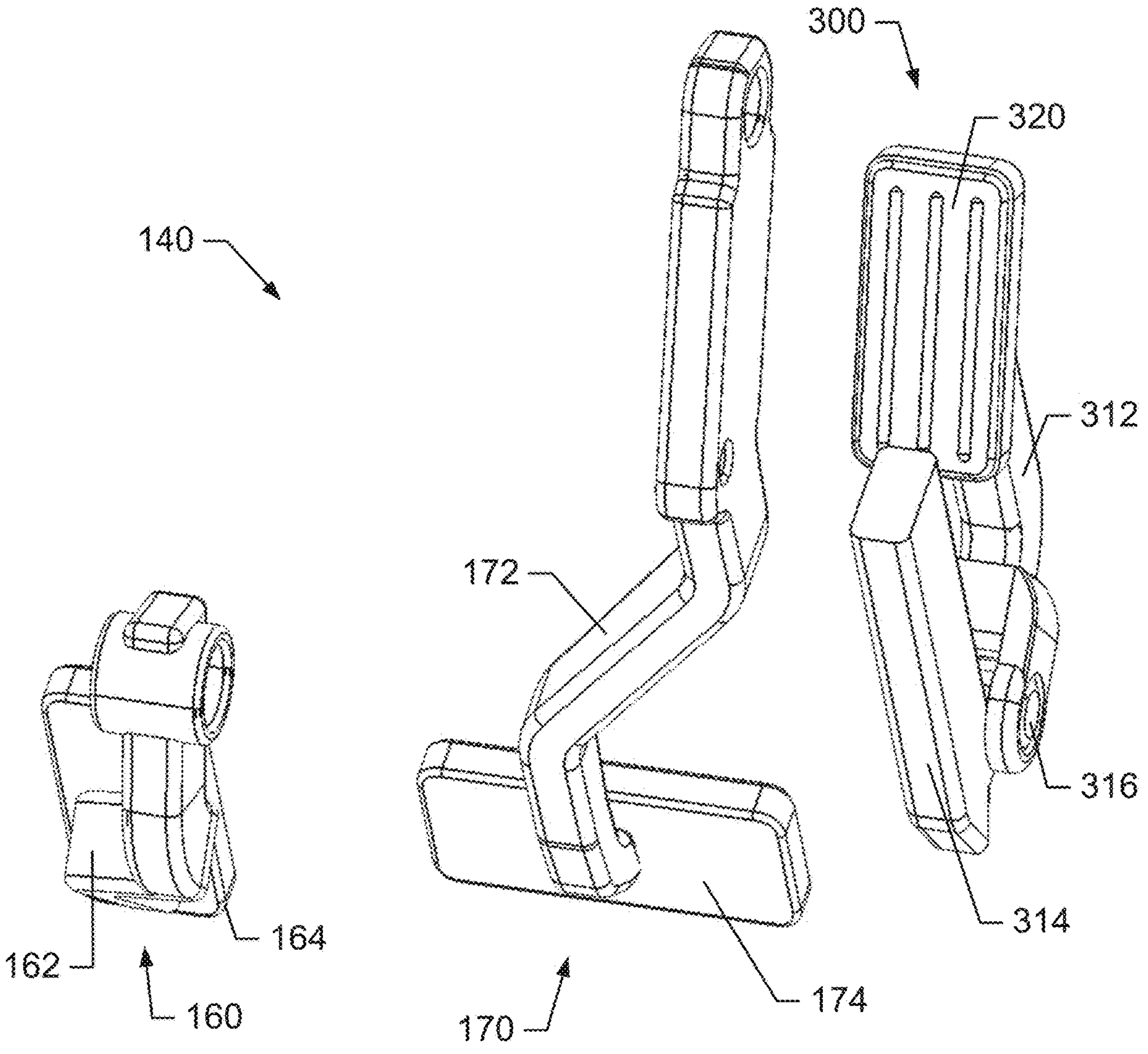
FIG. 17 illustrates a rear perspective view of the pedal assembly in the first state in accordance with an example embodiment.
Figure 18:
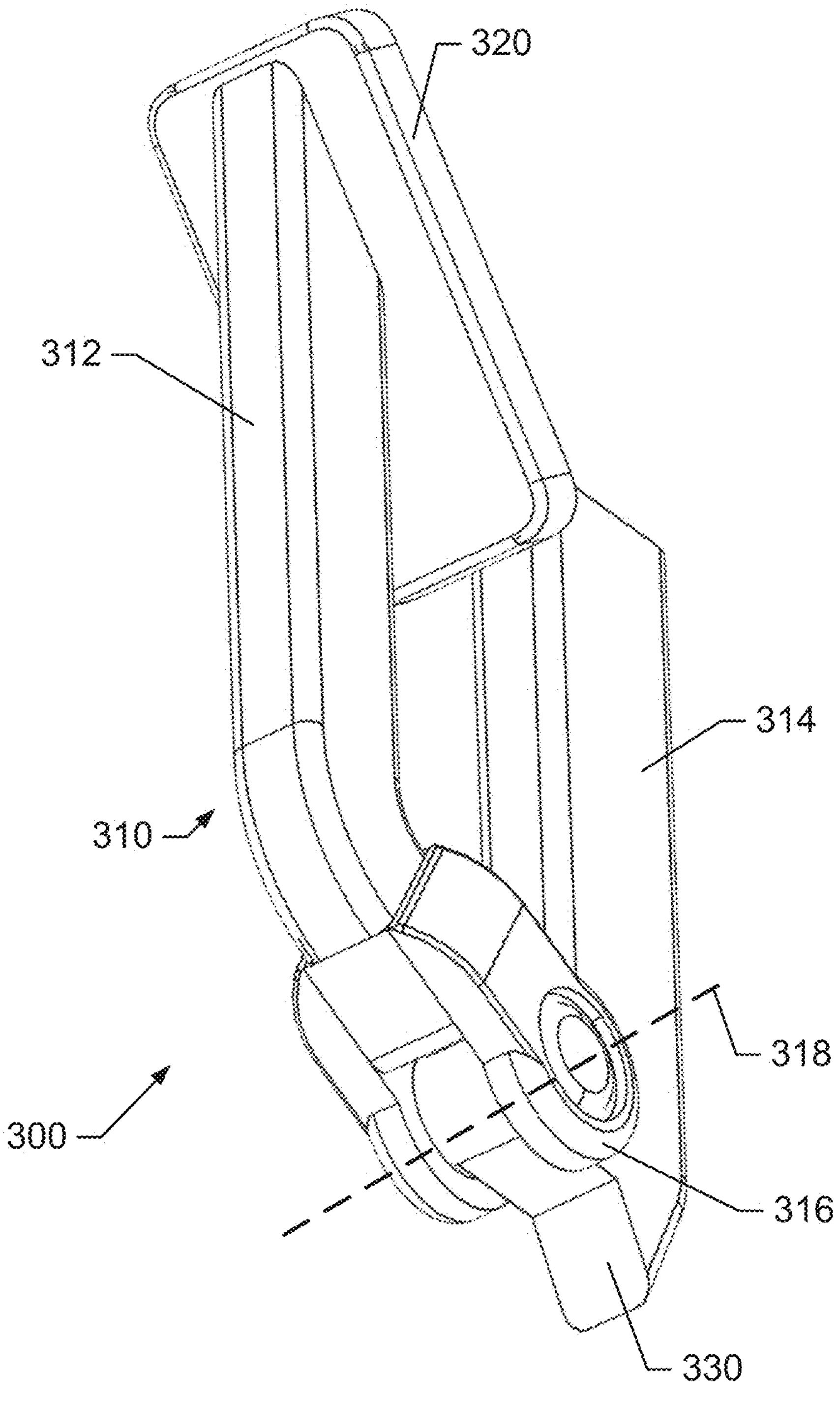
FIG. 18 illustrates a bottom perspective view of a third pedal in the first state in accordance with an example embodiment.

Shown best in FIGS. 10 and 11, the second pedal pad 174 may further include a hinge 260 via which the pivot portion 250 may be rotatably operably coupled to the base portion 240. The hinge 260 may define a first pivot axis 270 which may be disposed parallel to a short-side edge of the second pedal pad 174. The hinge 260 may be disposed at a distal edge of the second pedal pad 174 from the first pedal 160 when the second pedal pad 174 is in the closed position. In this regard, the hinge 260 may be disposed at a far side of the second pedal pad 174 from the first pedal 160 in the closed position, but in the open position, the hinge 260 may be disposed approximately in the center of the second pedal pad 174, between the pivot portion 250 and the base portion 240. As such, the pivot portion 250 may rotate away from the first pedal 160 when transitioning from the closed position to the open position. In other words, in the open position, the second pedal pad 174 may extend away from the first pedal 160 and closer to the left foot of the operator 130.

In an example embodiment, the hinge 260 may include a first fastener 280 coaxial/axially aligned with the first pivot axis 270. The first fastener 280 may threadably operably couple to the hinge 260 to lock and unlock the pivot portion 250 as desired. In this regard, with the second pedal pad 174 in the closed position, tightening the first fastener 280 into the hinge 260 may lock the second pedal pad 174 in the closed position, and therefore in the first state. Thus, to rotate the pivot portion 250 into the open position, the first fastener 280 must first be loosened from the hinge 260 to unlock the pivot portion 250. With the first fastener 280 loosened, the pivot portion 250 may be free to rotate about the first pivot axis 270. Responsive to entering the open position, the first fastener 280 may again be tightened into the hinge 260 to lock the second pedal pad 174 in the open position, and therefore in the second state. Accordingly, the pivot portion 250 may be rotatable relative to the base portion 240 responsive to loosening the first fastener 280, and the pivot portion 250 may be fixed relative to the base portion 240 responsive to tightening the first fastener 280. As such, the first fastener 280 may prevent the second pedal pad 174 from rotating between the open and closed states unintentionally. In some cases, such as the one depicted herein, the hinge 260 may further include a second fastener 290. In such cases, the second fastener 290 may be disposed at an opposite end of the hinge 260 from the first fastener 280, but may also be coaxial/axially aligned with the first pivot axis 270. In cases where the hinge 260 includes both the first and second fasteners (280, 290), the first and second fasteners (280, 290) may perform the same function outlined above, but as a group. Thus, to unlock the pivot portion 250, both the first and second fasteners (280, 290) may need to be loosened, and to lock/fix the pivot portion 250, both the first and second fasteners (280, 290) may need to be tightened.

In some example embodiments, the first fastener 280 and/or the second fastener 290 may include a same drive pattern as a plurality of other accessory fasteners used on the vehicle 100. In this regard, the operator 130 may only need to have a single drive tool (e.g. a screwdriver, a hex key, a wrench, a socket, etc.) to drive the first and second fasteners (280, 290) in addition to the plurality of other accessory fasteners. This may enable the operator 130 to efficiently equip the vehicle 100 for certain operating scenarios, such as off-road driving. For example, prior to beginning off road driving, the operator 130 may equip off-road accessories, such as visibility equipment, that may not be used for on road driving. Using the same tool that the operator used to equip the off road accessories, the operator 130 may torque the first and second fasteners (280, 290) to transition the pedal assembly 140 from the first state to the second state to accommodate left foot braking. In some cases, the drive pattern of the first and second fasteners (280, 290) may be triangular, square, rectangular, pentagonal, hexagonal, octagonal, cross shaped, x shaped, torx shaped, star shaped, flat head, Phillips head, or any other shape capable of transferring torque.

In the embodiment shown in FIGS. 8-15, the first actuation assembly may be the first pedal 160 and the second actuation assembly may be the second pedal 170. The first engagement portion having the first surface area may be the first pedal pad 164, and the second engagement portion may be the second pedal pad 174. In an example embodiment, the second surface area may be defined as the surface area of the first surface 252 of the pivot portion 250 when the pedal assembly 140 is in the first state, and as the combined surface area of the second and third surfaces (254, 242) when the pedal assembly 140 is in the second state.

FIGS. 16-21 illustrate various views of the pedal assembly 140 in accordance with an example embodiment. In the example embodiment depicted in FIGS. 16-21, the pedal assembly 140 may further include a third pedal 300. The third pedal 300 may be disposed on an opposite side of the second pedal 170 from the first pedal 160, and may be operably coupled to the brake assembly 110 of the vehicle 100 as well. In this regard, the third pedal 300 may perform the same action as the second pedal 170 with regard to controlling the vehicle 100. That is to say that actuating the third pedal 300 may also apply a stopping force at the wheels via the brake assembly 110 to slow and/or stop the vehicle 100. In some cases, the third pedal 300 may be disposed closer to the second sidewall 154 than the first sidewall 152, and closer to the second sidewall 154 than to the first pedal 160. This approximate location of the third pedal 300 may be a more desirable position to actuate with the left foot of the operator 130 than the second pedal 170.

The third pedal 300 may include a third pedal arm 310 and a third pedal pad 320, similar to the first and second pedal arms (162, 172) and the first and second pedal pads (164, 174). In this regard, the third pedal 300 may be actuatable by the operator 130 by receiving a force from the operator 130 at the third pedal pad 320. The third pedal 300 may be operably coupled to the master cylinder via a pushrod. Responsive to the third pedal 300 being actuated, the third pedal arm 310 may apply a force on the pushrod which may push a piston inside the master cylinder and force brake fluid through the brake fluid lines to the brake calipers disposed at the wheels to apply the stopping force to the wheels. In some cases, the third pedal 300 may be operably coupled to the brake assembly 110 independently of the second pedal 170. As such, the third pedal 300 may be actuated to apply the stopping force to the wheels without moving the second pedal 170 at all. In other example embodiments, the third pedal 300 may be operably coupled to the brake assembly 110 via the second pedal 170. As such, responsive to the third pedal 300 being actuated to apply the stopping force to the wheels, the second pedal 170 may be move in sync with the third pedal 300 to apply the stopping force via the brake assembly 110.

Figure 19:
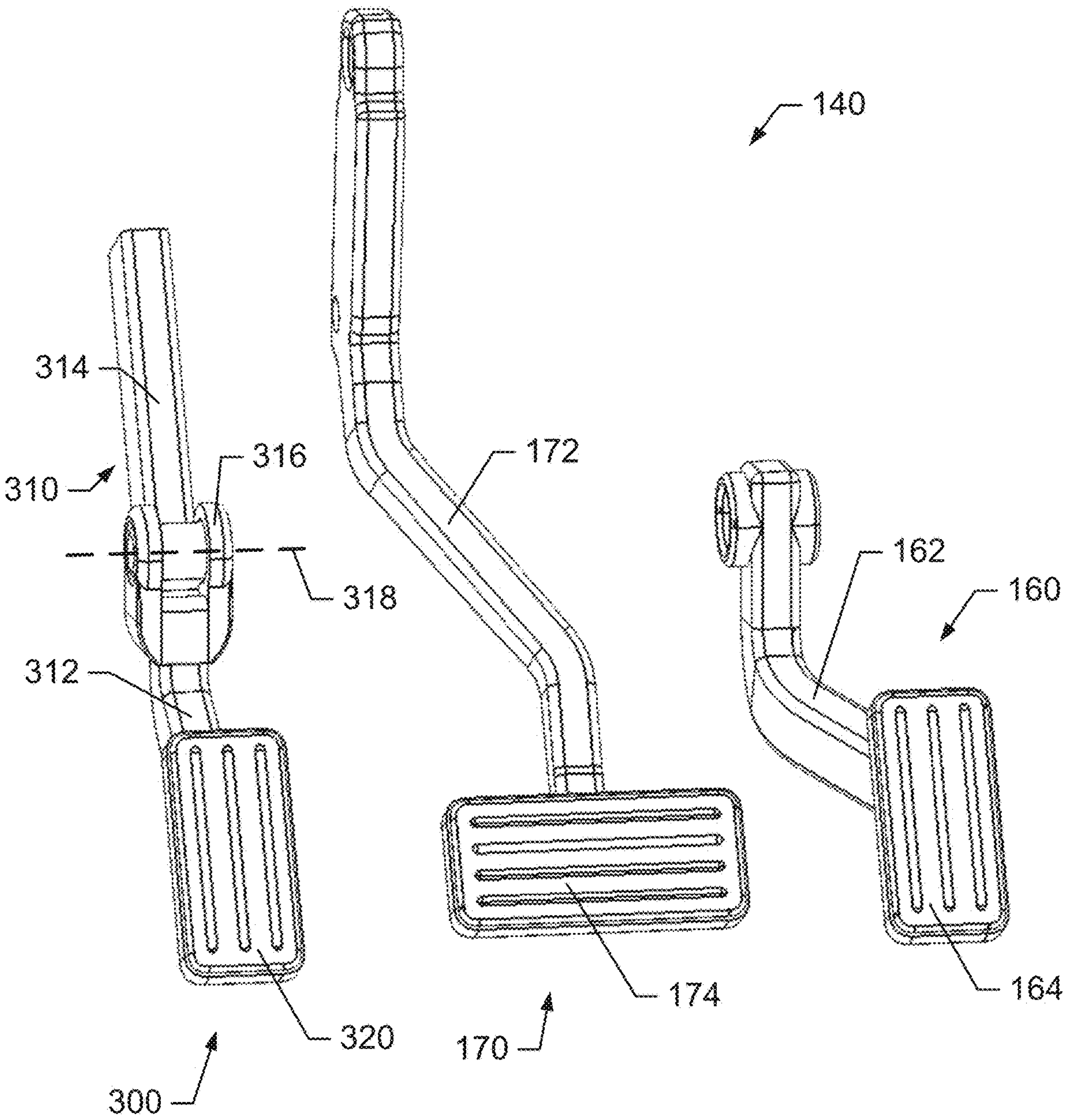
FIG. 19 illustrates a perspective view of the pedal assembly in the second state in accordance with an example embodiment.
Figure 20:
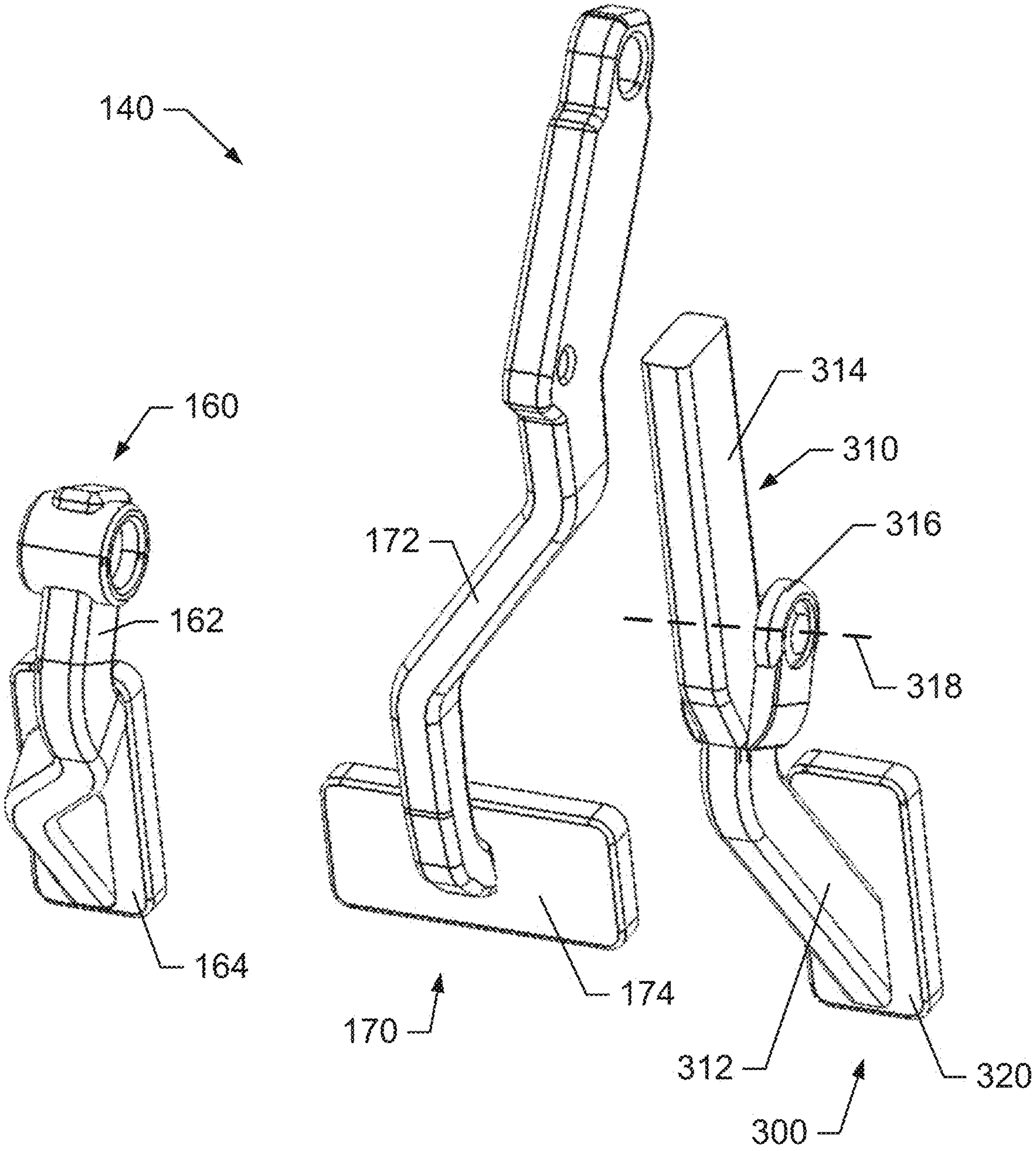
FIG. 20 illustrates a rear perspective view of the pedal assembly in the second state in accordance with an example embodiment.
Figure 21:
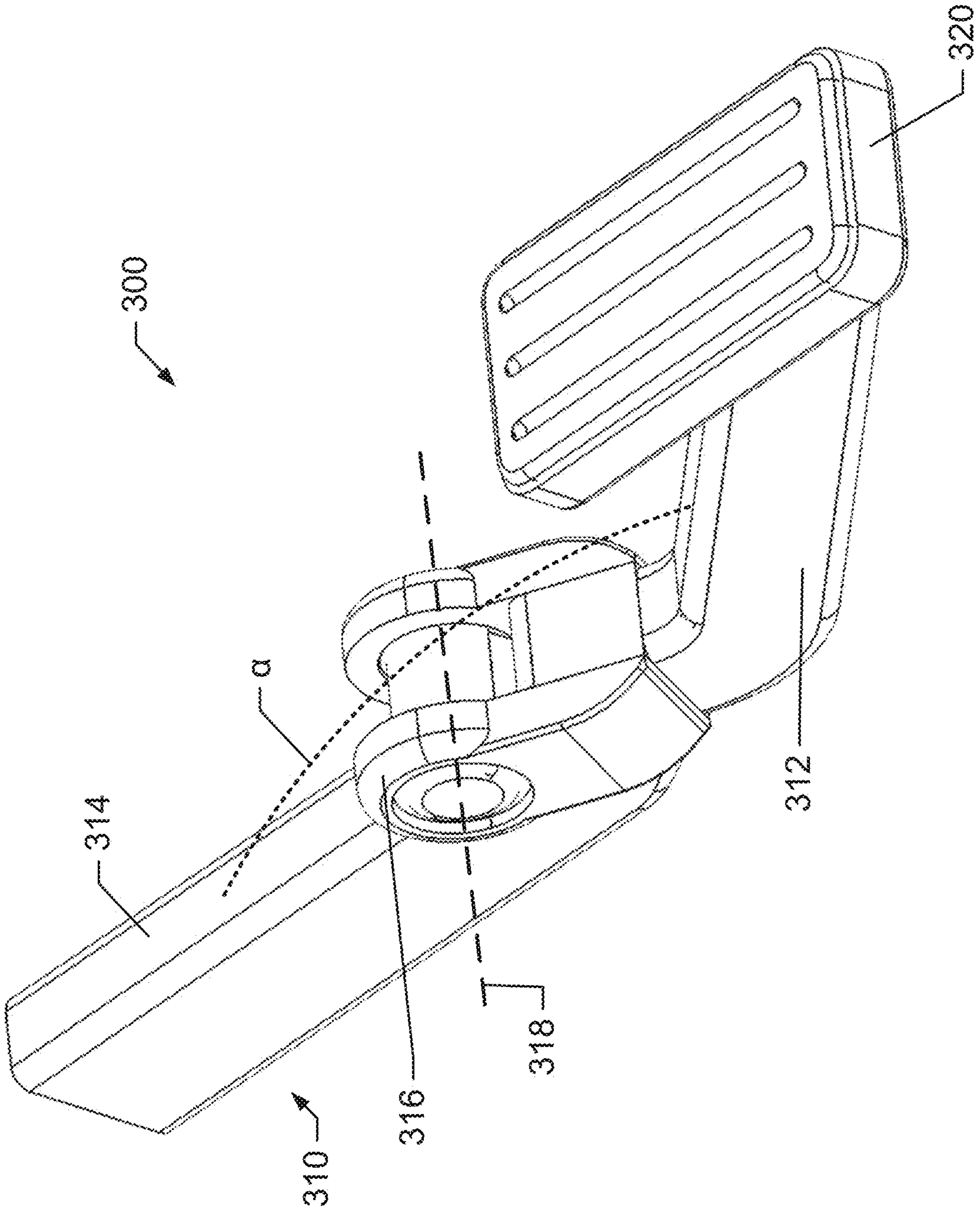
FIG. 21 illustrates a perspective view of the third pedal in the second state in accordance with an example embodiment.
Figure 22:
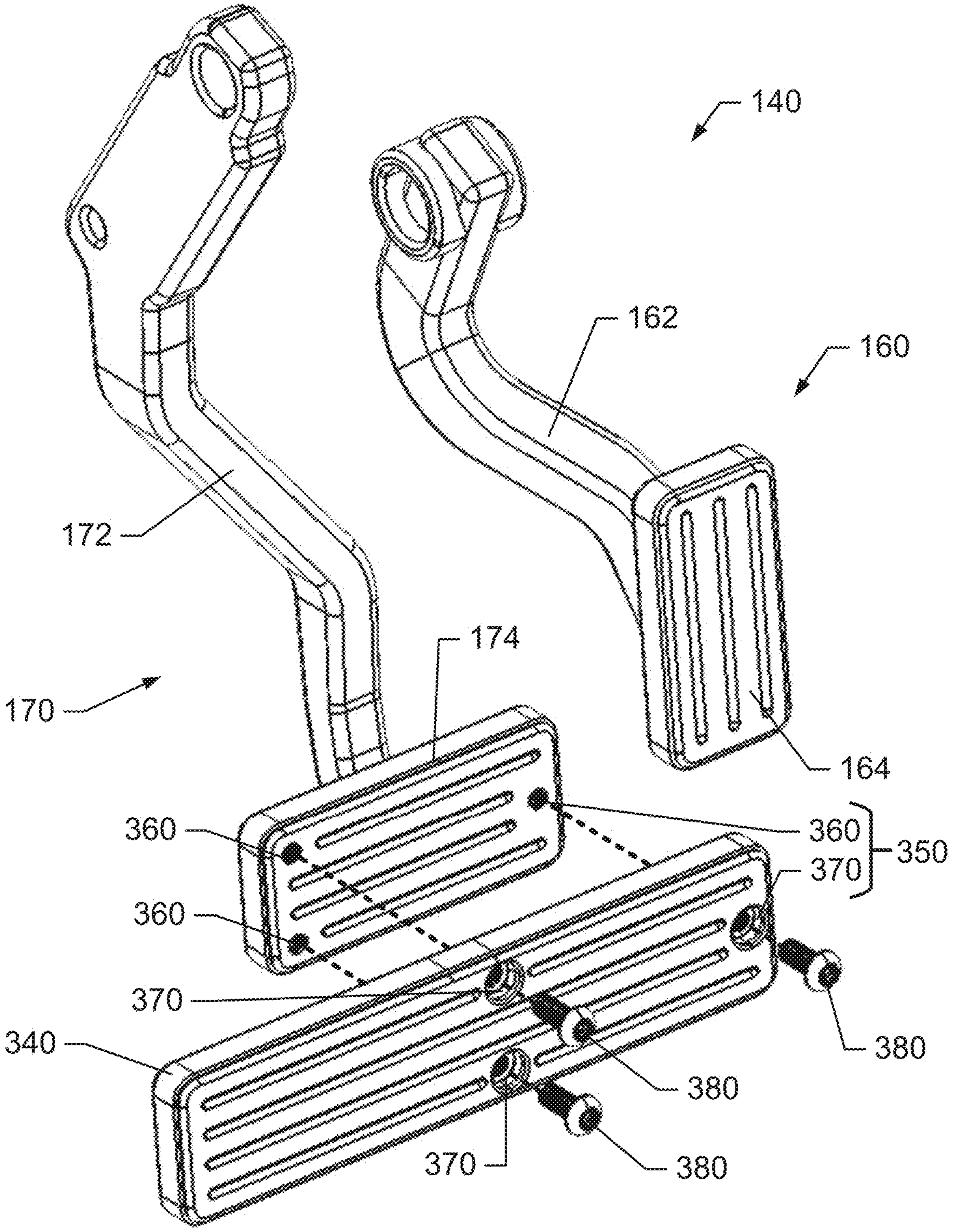
FIG. 22 illustrates a perspective view of the pedal assembly in the first state in accordance with an example embodiment.

Unlike the first pedal 160 and the second pedal 170, the third pedal 300 may be rotatable between a deployed position (shown in FIGS. 16-18) and a stowed position (shown in FIGS. 19-21). In this regard, the third pedal arm 310 may include a lower arm portion 312 operably coupled to the third pedal pad 320, an upper arm portion 314 operably coupled to the brake assembly 110, and a knuckle joint 316 rotatably operably coupling the lower arm portion 312 to the upper arm portion 314. Best seen in FIGS. 18 and 21, the knuckle joint 316 may resemble a clevis joint, where the lower arm portion 312 may comprise the clevis and the upper arm portion 314 may be the tang disposed between the clevis legs. The upper arm portion 314 (i.e. the tang in this clevis joint description) may operably couple to the clevis of the lower arm portion 312 via a pin, and the pin may define a second pivot axis 318 of the knuckle joint 316. As such, the lower arm portion 312 may rotate relative to the upper arm portion 314 via the knuckle joint 316, and about the second pivot axis 318, between the deployed and stowed positions.

In some cases, the stowed position may correspond to the first state and the deployed position may correspond to the second state. Thus, in an example embodiment, the third pedal 300 may be operable in lieu of the second pedal 170 to provide operational inputs to the brake assembly 110 while in the second state. In some cases, the rotatable design of the third pedal 300 may allow for the operator 130 to free up space in the footwell 150 during normal or single footed operation of the pedal assembly 140 in the first state. In this regard, the third pedal 300 may be folded up into the stowed position, in which the third pedal 300 may reside substantially above the footwell 150 and out of the way of the operator 130 to prevent unintentional actuation of the third pedal 300. On the other hand, prior to entering a specific operating scenario, such as off-road driving, the operator 130 may fold down the third pedal 300 into the deployed position to enable two footed operation of the pedal assembly 140 in the second state. In the stowed position, the lower arm portion 312 may be disposed proximate to the upper arm portion 314 and above the footwell 150 in which the pedal assembly 140 may be disposed. Conversely, in the deployed position, the lower arm portion 312 may be disposed distal to the upper arm portion 314 and may extend down into the footwell 150.

In an example embodiment, the upper arm portion 314 may include a rotational stop 330. In this regard, in the deployed position, the rotational stop 330 may be in contact with the knuckle joint 316 to define an angular orientation of the lower arm portion 312. As such, the rotational stop 330 may enable the lower arm portion 312 and the upper arm portion 314 to move together responsive to receiving an input force from the operator 130 on the third pedal pad 320. In this regard, when transitioning the third pedal 300 from the stowed position to the deployed position, the lower arm portion 312 may not be rotated beyond a predetermined maximum angle ($\alpha$) that may be defined by the rotational stop 330. In some cases, the rotational stop 330 may be an extension or protrusion of the upper arm portion 314 which may be disposed to come into contact with the clevis of the knuckle joint 316 responsive to the third pedal 300 transitioning from the stowed position to the deployed position. In some cases, the third pedal 300 may include a locking assembly that may prevent transitions of the third pedal 300 between the stowed and deployed positions when in a locked state, and may enable the third pedal 300 to transition between the deployed and stowed positions when in an unlocked state. In an example embodiment, the locking assembly may rely on a manual release mechanism, an electronic release mechanism, a locking pin, friction, an adhesive, a key, a fastener, a biasing member, or any other sort of mechanism or component to prevent unintentional transitions between the stowed and deployed positions.

In the embodiment shown in FIGS. 16-21, the first actuation assembly may be the first pedal 160 and the second actuation assembly may include both the second pedal 170 and the third pedal 300. The first engagement portion having the first surface area may be the first pedal pad 164, and the second engagement portion may include both the second pedal pad 174 and the third pedal pad 320. In an example embodiment, the second surface area may be defined as the surface area of the second pedal pad 174 when the pedal assembly 140 is in the first state, and as the combined surface area of the second and third pedal pads (174, 320) when the pedal assembly 140 is in the second state.

FIGS. 22-29 illustrate various views of the pedal assembly 140 in accordance with an example embodiment. In the example embodiment depicted in FIGS. 22-29, a pedal pad attachment 340 may be removably operably coupleable to the second pedal pad 174. The pedal pad attachment 340 of some cases may visually resemble the second pedal pad 174, but may include a larger area than the second pedal pad 174.

In this regard, the pedal pad attachment 340 may operably couple to the second pedal pad 174, but may also extend beyond the perimeter of the second pedal pad 174 and towards the second sidewall 154 of the footwell 150. In other words, the pedal pad attachment 340 may increase the surface area via which the operator 130 may actuate the second pedal 170 by extending toward the second sidewall 154 of the footwell 150. This orientation of the pedal pad attachment 340 may provide the operator 130 with a more desirable alternative to actuate the second pedal 170 via left foot braking. Thus, the first state of the pedal assembly 140 may correspond to the pedal pad attachment 340 being removed from the second pedal pad 174, and the second state of the pedal assembly 140 may correspond to the pedal pad attachment 340 being operably coupled to the second pedal pad 174.

Figure 23:
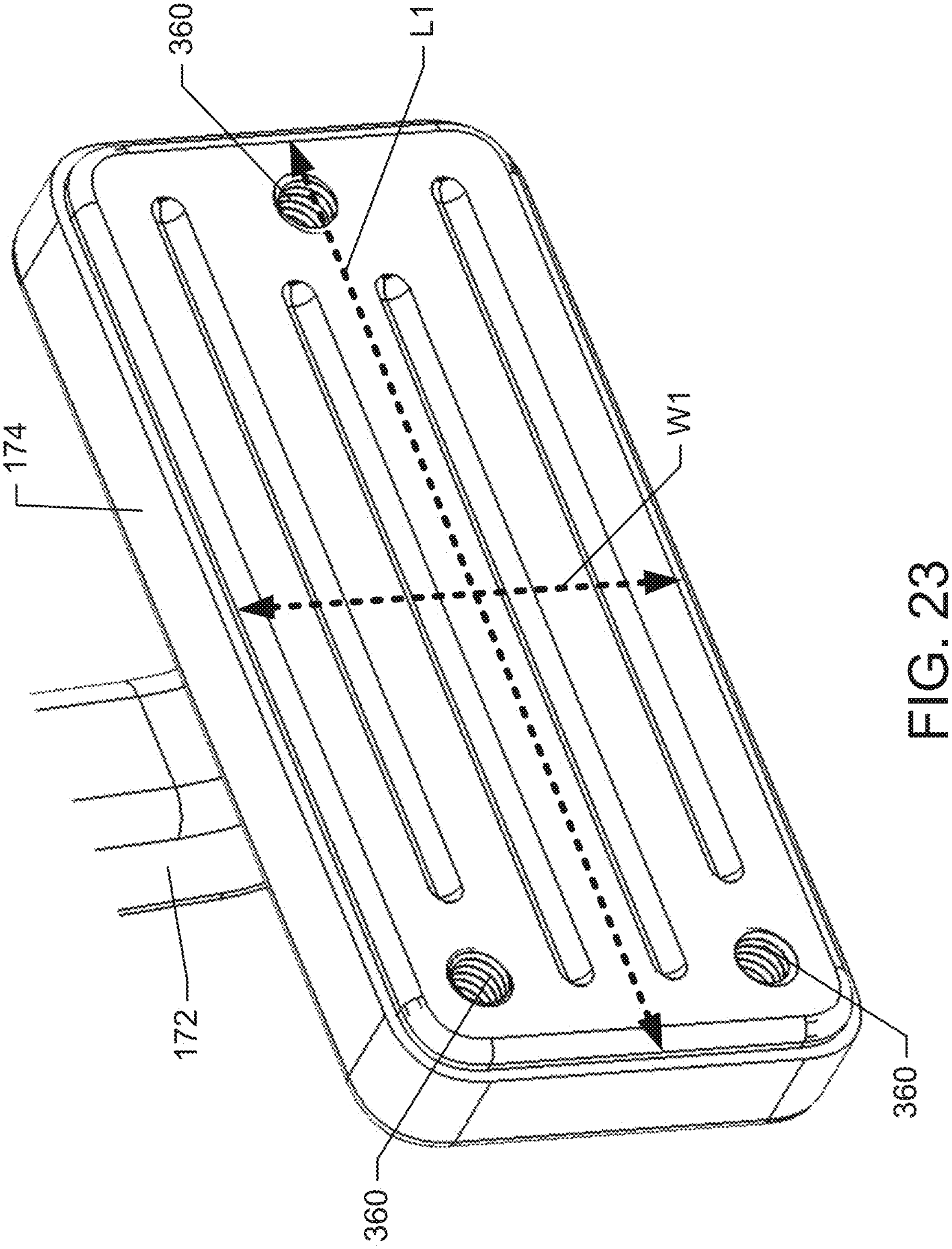
FIG. 23 illustrates a close up perspective view of the second pedal in the first state in accordance with an example embodiment.
Figure 24:
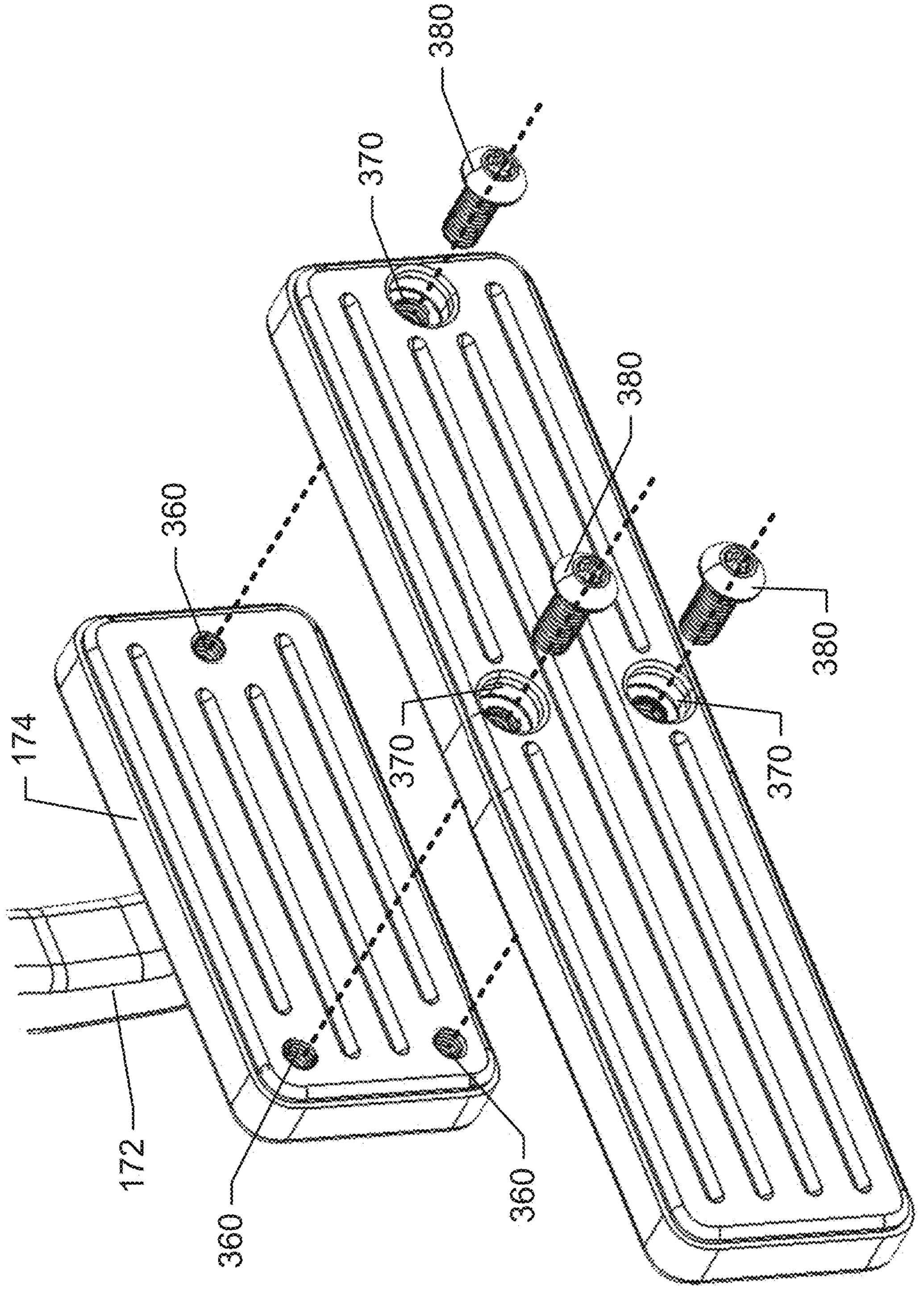
FIG. 24 illustrates a perspective view of the second pedal in the first state in accordance with an example embodiment.
Figure 25:
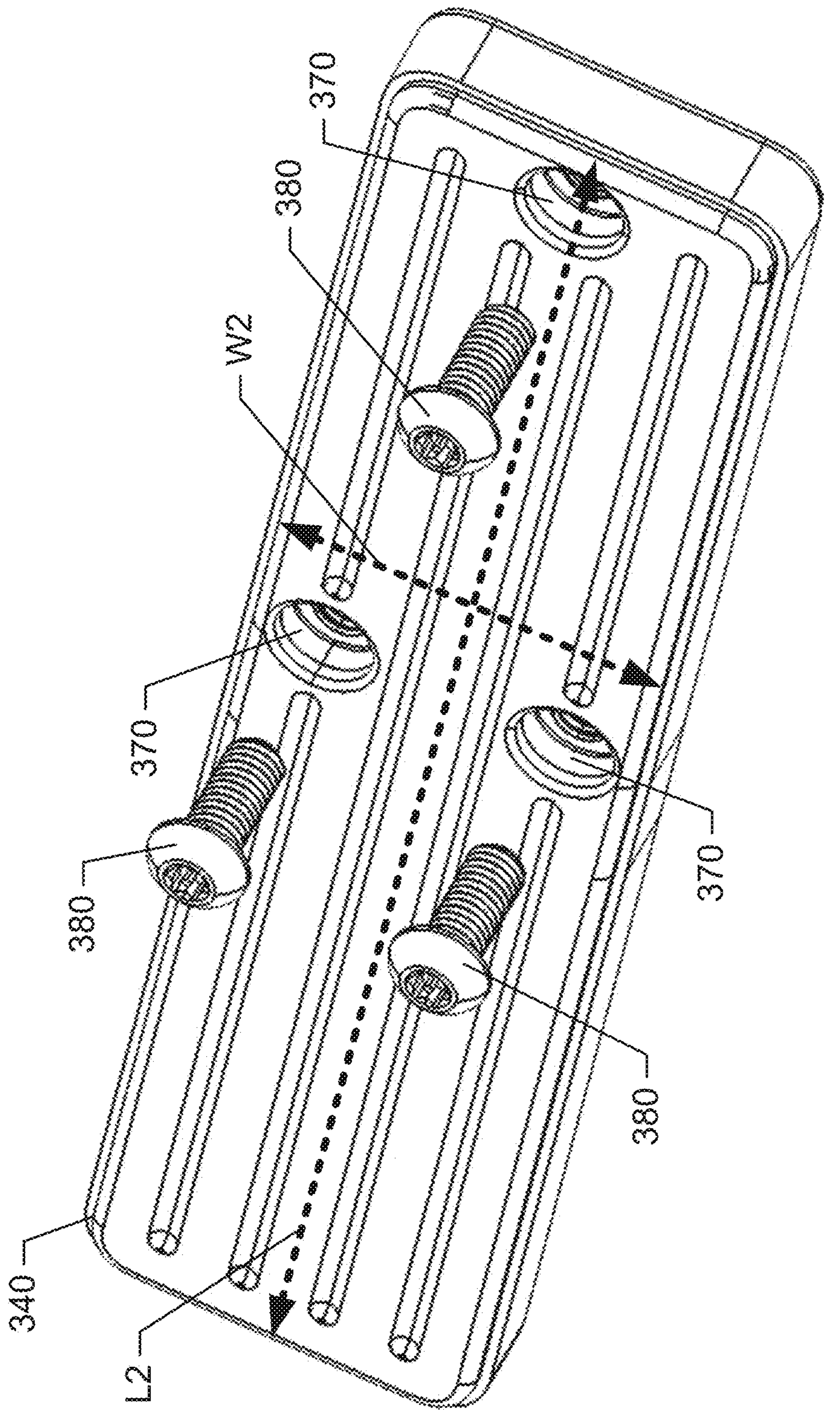
FIG. 25 illustrates a perspective view of the pedal pad attachment in accordance with an example embodiment.
Figure 26:
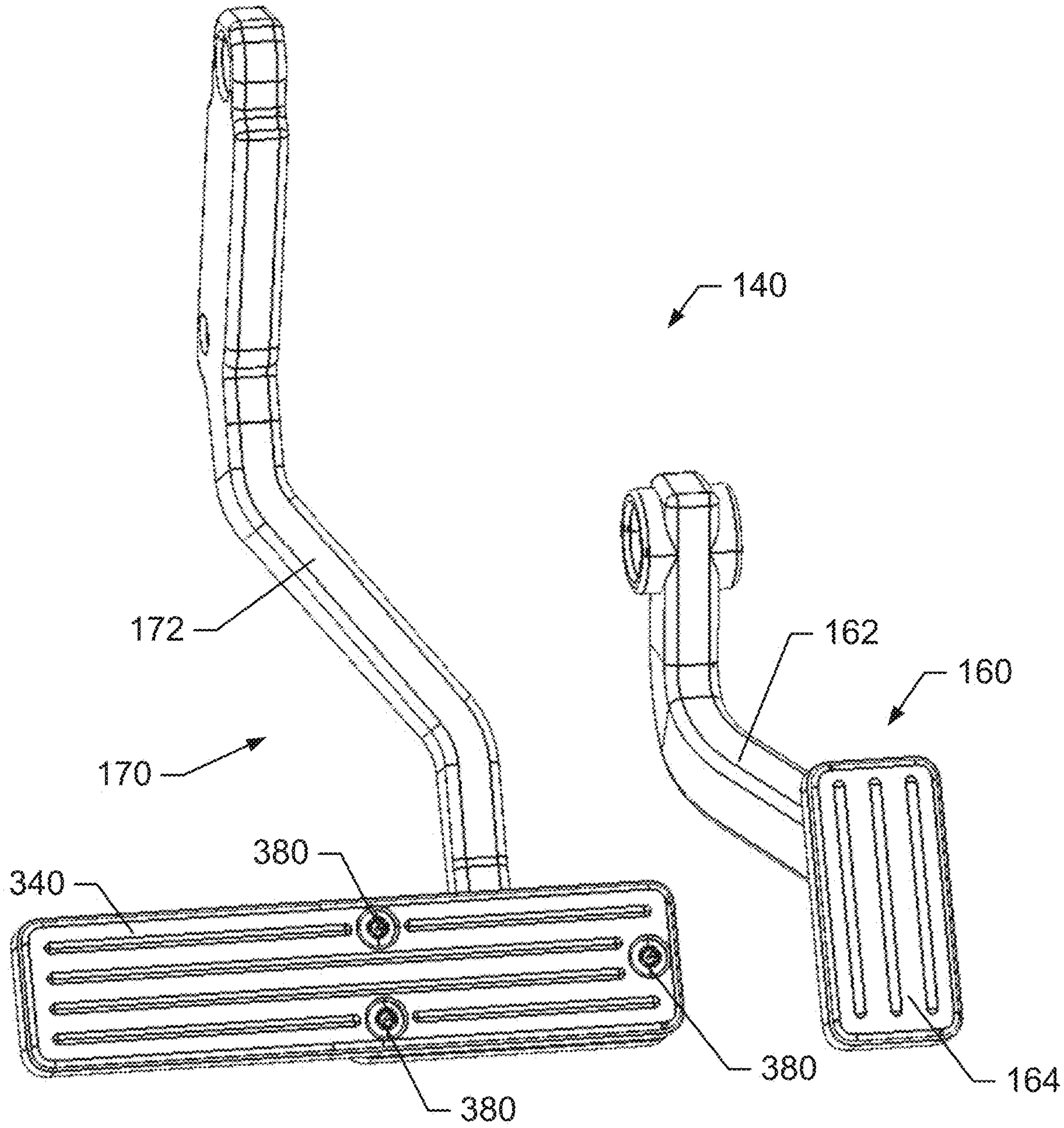
FIG. 26 illustrates a perspective view of the pedal assembly in the second state in accordance with an example embodiment.
Figure 27:
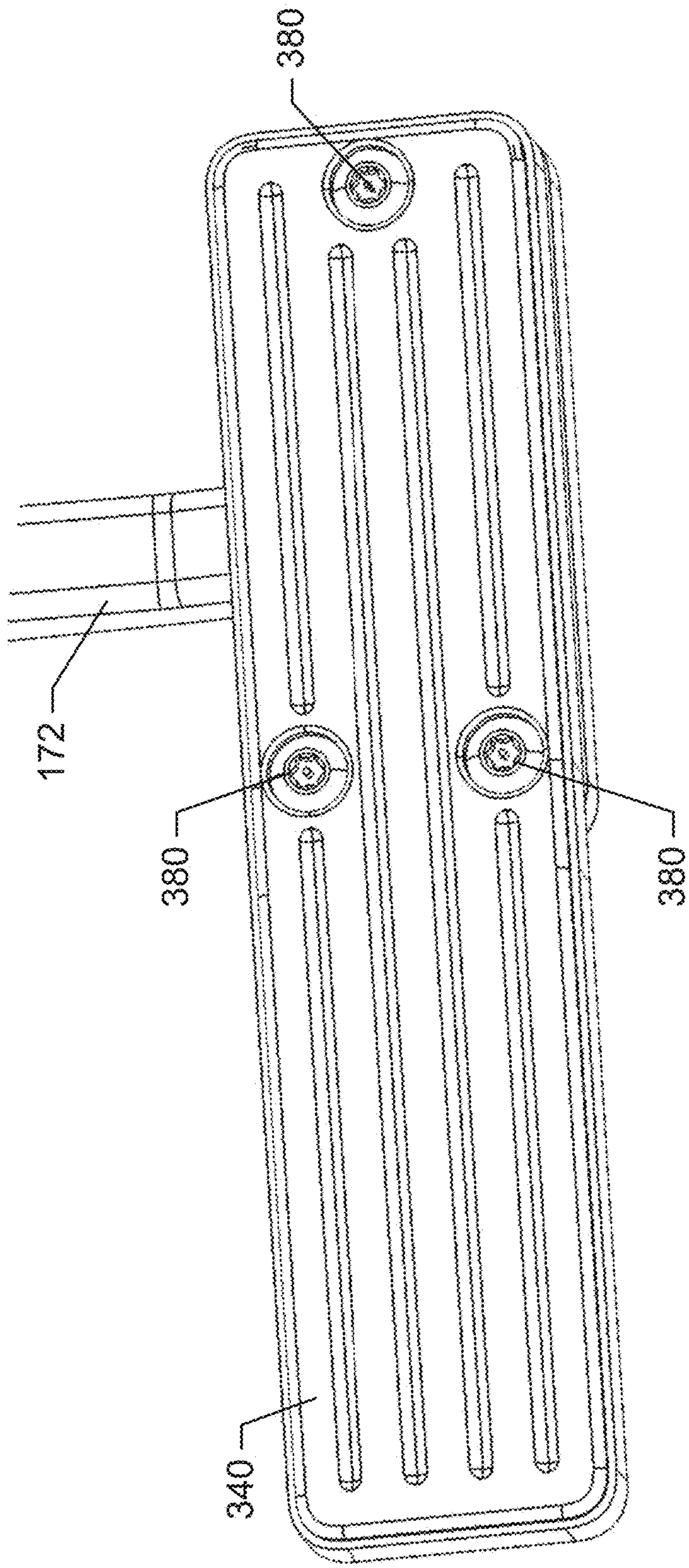
FIG. 27 illustrates a close up perspective view of the second pedal in the second state in accordance with an example embodiment.
Figure 28:
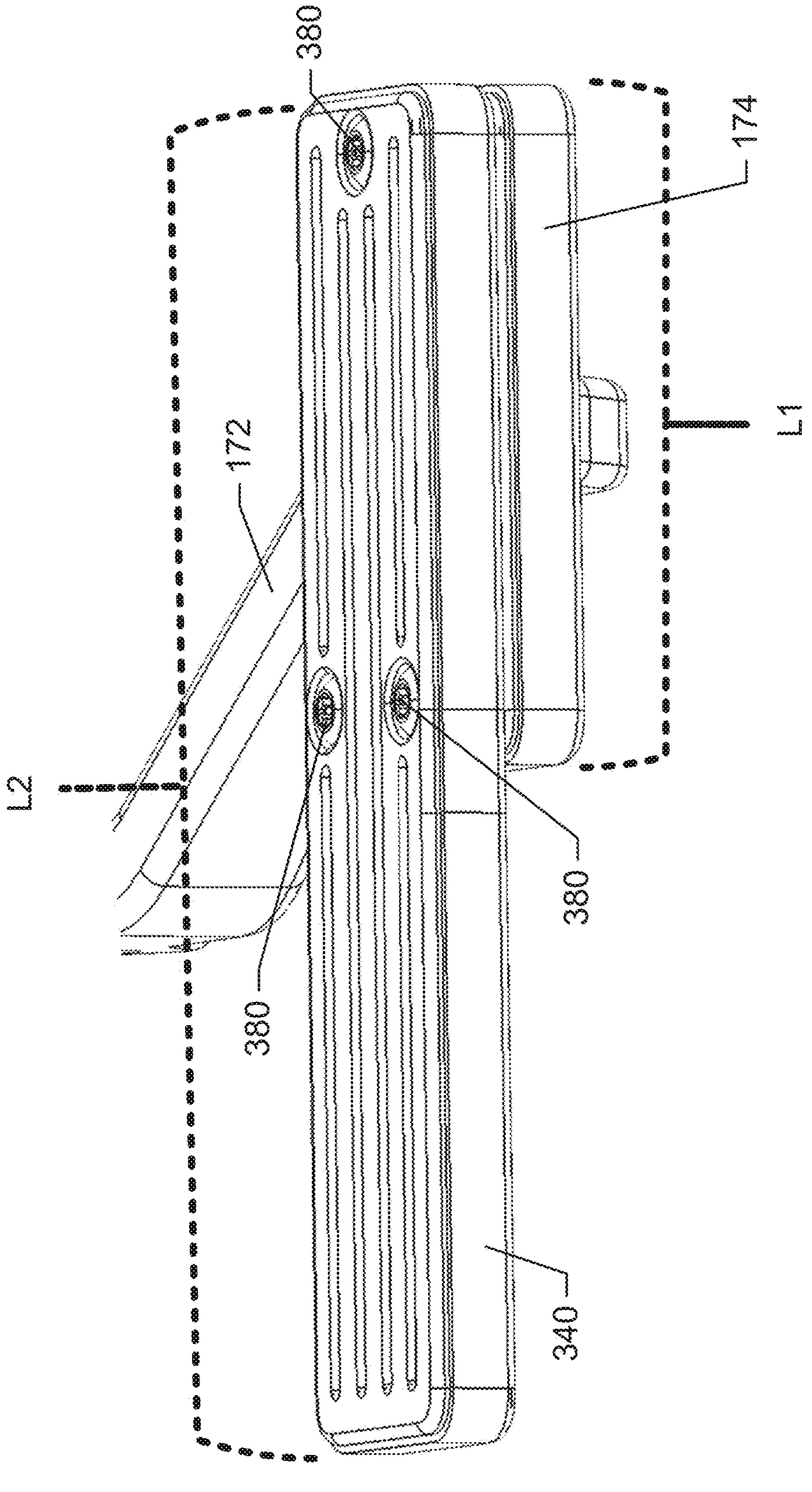
FIG. 28 illustrates a close up bottom perspective view of the second pedal in the second state in accordance with an example embodiment.
Figure 29:
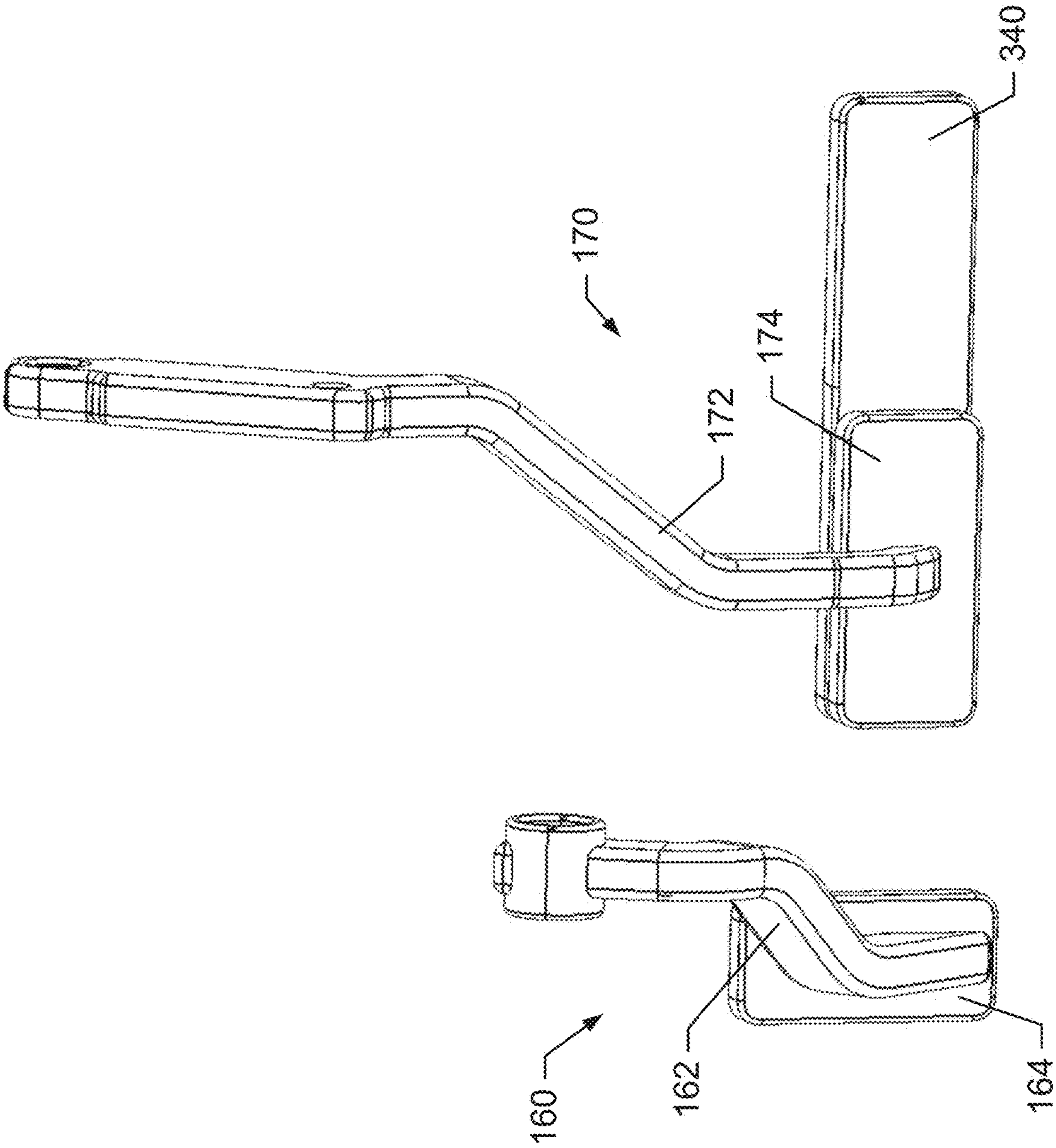
FIG. 29 illustrates a rear perspective view of the pedal assembly in the second state in accordance with an example embodiment.

Best shown in FIGS. 23, 25 and 28, the second pedal pad 174 may have a first length (L1) and a first width (W1), and the pedal pad attachment 340 may have a second length (L2) and a second width (W2). In some cases, the first width (W1) of the second pedal pad 174 may be the same as the second width (W2) of the pedal pad attachment 340. Additionally, the first length (L1) of the second pedal pad 174 may be less than the second length (L2) of the pedal pad attachment 340. In this regard, the pedal pad attachment 340 may only extend beyond the second pedal pad 174 over the distal edge of the second pedal pad 174 from the first pedal 160. In an example embodiment, the second length (L2) may be approximately twice as long as the first length (L1). However, it should be appreciated that in some other embodiments, the first width (W1), the second width (W2), the first length (L1) and the second length (L2) may have different sizes, relative sizes, and ratios of sizes therebetween. For example, in some cases, the second width (W2) may be larger than the first width (W1). In an example embodiment, the second width (W2) may be larger than the first width (W1) by approximately 1.5 times. In some other cases, the second width (W2) may be larger than the first width (W1) by approximately 2 times. In an example embodiment, the second width (W2) may be smaller than the first width (W1). In some cases, the second length (L2) may be longer than the first length (L1) by approximately 3 times. In any case, the second length (L2) may be longer than the first length (L1) by an amount sufficient to enhance the operator's 130 experience utilizing left foot braking.

The pedal pad attachment 340 of some example embodiments may be operably coupled to the second pedal pad 174 via a coupling assembly 350. The coupling assembly 350 may include a first plurality of receiving orifices 360 disposed at the second pedal pad 174, and a second plurality of receiving orifices 370 disposed at the pedal pad attachment 340. Both of the first and second pluralities of receiving orifices (360, 370) may be disposed in a same pattern to enable each individual orifice of the first plurality of receiving orifices 360 to align with a respective individual orifice of the second plurality of receiving orifices 370 responsive to the pedal pad attachment 340 being operably coupled to the second pedal pad 174. In some cases, each individual orifice of the first and second pluralities of receiving orifices (360, 370) may be threaded as well. In this regard, the first plurality of receiving orifices 360 may be operably coupleable to the second plurality of receiving orifices 370 via a plurality of fasteners 380 that may extend through the second plurality of receiving orifices 370 and into the first plurality of receiving orifices 360. As such, the plurality of fasteners 380 may be in threaded engagement with both of the first and second pluralities of receiving orifices (360, 370) while the pedal pad attachment 340 is operably coupled to the second pedal pad 174.

In some cases, the plurality of fasteners 380 may operably couple to the coupling assembly 350 in a unidirectional orientation. In this regard, the pedal pad attachment 340 may only operably couple to the second pedal pad 174 in a proper orientation for use with left foot braking. The pedal pad attachment 340 may not be operably coupleable to the second pedal pad 174 in any other orientation besides the unidirectional orientation. As such, the pedal pad attachment 340 may not interfere with the operation of the first pedal 160 at all. In other words, the pedal pad attachment 340 may be operably coupleable to the second pedal pad 174 in a poka-yoke manner via the coupling assembly 350 and the plurality of fasteners 380 so that the pedal pad attachment 340 may extend away from the first pedal 160 in the unidirectional orientation. In the example embodiment depicted herein, the coupling assembly 350 may include a total of six receiving orifices, with three being disposed in each of the first and second pluralities of receiving orifices (360, 370), and a total of three fasteners in the plurality of fasteners 380. As such, the three fasteners in the plurality of fasteners 380 may be inserted into the three pairs of receiving orifices in the first and second pluralities of receiving orifices (360, 370). In such cases, the three pairs of receiving orifices in the first and second pluralities of receiving orifices (360, 370) may be disposed in a triangular pattern. However, it should be appreciated that more or less receiving orifices and corresponding fasteners may be used, and they may be disposed in any sort of pattern depending on how many fasteners may be used. In some cases, the fasteners that make up the plurality of fasteners 380 may also be the same type of fastener as described above in reference to FIGS. 8-15. As such, the pedal pad attachment 340 may be secured to the second pedal pad 174 using the same drive tool as other accessories around the vehicle 100.

In the embodiment shown in FIGS. 22-29, the first actuation assembly may be the first pedal 160 and the second actuation assembly may be the second pedal 170. The first engagement portion having the first surface area may be the first pedal pad 164, and the second engagement portion may be the second pedal pad 174. In an example embodiment, the second surface area may be defined as the surface area of the second pedal pad 174 without the pedal pad attachment 340 when the pedal assembly 140 is in the first state, and as the surface area of the pedal pad attachment 340 when the pedal assembly 140 is in the second state.

A pedal assembly for providing operational inputs to a vehicle may therefore be provided. The pedal assembly may include a first pedal which may include a first pedal arm and a first pedal pad and may be operably coupled to a powertrain of the vehicle, and a second pedal which may include a second pedal arm and a second pedal pad and may be operably coupled to a brake assembly of the vehicle. The second pedal arm may be operably coupled to a linear actuator assembly. The linear actuator assembly may laterally displace the second pedal between a first position in which the second pedal may be disposed proximate to the first pedal, and a second position in which the second pedal may be disposed further away from the first pedal than the first position.

The pedal assembly of some embodiments may include additional features, modifications, augmentations and/or the like to achieve further objectives or enhance performance of the pedal assembly. The additional features, modifications, augmentations and/or the like may be added in any combination with each other. Below is a list of various additional features, modifications, and augmentations that can each be added individually or in any combination with each other. For example, the linear actuator assembly may include a lead screw which may extend between a first sidewall and a second sidewall of a footwell in which the pedal assembly may be disposed, a clevis bracket which may operably couple the second pedal arm to the brake assembly, and a motor which may be operably coupled to the lead screw to rotate the lead screw. In some cases, the lead screw may include a thread assembly and the clevis bracket may be in threaded engagement with the thread assembly. In an example embodiment, responsive to the motor rotating the lead screw, the clevis bracket may be displaced along the lead screw and may carry the second pedal between the first position and the second position. In some cases, the brake assembly may include a piston, a cylinder and a fluid line operably coupled to the second pedal via the clevis bracket. In an example embodiment, responsive to the motor rotating the lead screw, the clevis bracket may carry the piston, the cylinder and the fluid line with the second pedal between the first position and the second position. In some cases, in the first position, the clevis bracket may be disposed at a first end of the thread assembly, and in the second position, the clevis bracket may be disposed at a second end of the thread assembly.

In accordance with another example embodiment, a pedal assembly for providing operational inputs to a vehicle may therefore be provided. The pedal assembly may include a first actuation assembly operably coupled to a powertrain of the vehicle and a second actuation assembly operably coupled to a brake assembly of the vehicle. The first actuation assembly may include a first engagement portion having a first surface area. The second actuation assembly may include a second engagement portion having a second surface area. The second actuation assembly may be configurable in a first state and a second state. The second surface area may be larger in the second state than in the first state.

The pedal assembly of some embodiments may include additional features, modifications, augmentations and/or the like to achieve further objectives or enhance performance of the pedal assembly. The additional features, modifications, augmentations and/or the like may be added in any combination with each other. Below is a list of various additional features, modifications, and augmentations that can each be added individually or in any combination with each other. For example, the first actuation assembly may include a first pedal and the first engagement portion may include a first pedal pad operably coupled to the first pedal. In some cases, the second actuation assembly may include a second pedal and the second engagement portion may include a second pedal pad operably coupled to the second pedal. In an example embodiment, the second pedal pad may include a pivot portion and a base portion, the pivot portion may be rotatably operably coupled to a base portion. In some cases, the pivot portion may be rotatable relative to the base portion between a closed position and an open position. In an example embodiment, the closed position may correspond to the first state and the open position may correspond to the second state. In some cases, the pivot portion may have a same shape as the base portion and a same area as the base portion. In an example embodiment, the pivot portion may be operably coupled to the base portion at a hinge disposed at a distal edge of the second pedal pad from the first pedal. In some cases, the hinge may include a fastener which may be axially aligned along a first pivot axis which may extend parallel to an edge of the second pedal pad. In an example embodiment, the pivot portion may be rotatable relative to the base portion responsive to loosening the fastener. In some cases, the pivot portion may be fixed relative to the base portion responsive to tightening the fastener. In an example embodiment, the second actuation assembly may further include a third pedal and the second engagement portion may further include a third pedal pad operably coupled to the third pedal. In some cases, the second engagement portion may include the second pedal pad and the third pedal pad. In an example embodiment, the third pedal may be disposed on an opposite side of the second pedal from the first pedal and operably coupled to the brake assembly of the vehicle. In some cases, the third pedal may be rotatable between a deployed position and a stowed position. In an example embodiment, the stowed position may correspond to the first state and the deployed position may correspond to the second state. In some cases, the third pedal may be operable in lieu of the second pedal to provide the operational inputs to the brake assembly while in the second state. In an example embodiment, the third pedal may further include a third pedal arm which may include a lower arm portion operably coupled to the third pedal pad, an upper arm portion operably coupled to the brake assembly and a knuckle joint rotatably operably coupling the lower arm portion to the upper arm portion. In some cases, the lower arm portion may be rotatable about the knuckle joint between the deployed position and the stowed position. In some cases, in the stowed position, the lower arm portion may be disposed proximate to the upper arm portion and above a footwell in which the pedal assembly may be disposed. In an example embodiment, in the deployed position, the lower arm portion may extend away from the upper arm portion into the footwell. In some cases, the upper arm portion may include a rotational stop that, in the deployed position, may be in contact with the lower arm portion. In an example embodiment, the rotational stop may define an angular orientation of the lower arm portion in the deployed position and may enable the lower arm portion and the upper arm portion to move together responsive to receiving an input force. In some cases, the first actuation assembly may include a first pedal and the first engagement portion may include a first pedal pad operably coupled to the first pedal. In an example embodiment, the second actuation assembly may include a second pedal and the second engagement portion may include a second pedal pad operably coupled to the second pedal. In some cases, a pedal pad attachment may be removably operably coupleable to the second pedal pad. In an example embodiment, the first state may correspond to the pedal pad attachment being removed from the second pedal pad. In some cases, the second state may correspond to the pedal pad attachment being operably coupled to the second pedal pad. In an example embodiment, the pedal assembly may include a coupling assembly to operably couple the pedal pad attachment to the second pedal pad, the coupling assembly may include a first plurality of receiving orifices which may be disposed at the second pedal pad, and a second plurality of receiving orifices which may be disposed at the pedal pad attachment. In some cases, the first plurality of receiving orifices may be operably coupleable to the second plurality of receiving orifices in a unidirectional orientation via a plurality of fasteners. In an example embodiment, the pedal pad attachment may extend away from the first pedal in the unidirectional orientation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

Such operations described herein should always be implemented and/or performed in accordance with the owner's manual and safety guidelines.

What is claimed:

1. A pedal assembly for providing operational inputs to a vehicle, the pedal assembly comprising:

a first pedal operably coupled to a powertrain of the vehicle, the first pedal comprising a first pedal arm and a first pedal pad; and a second pedal operably coupled to a brake assembly of the vehicle, the second pedal comprising a second pedal arm and a second pedal pad, wherein the second pedal arm is operably coupled to a linear actuator assembly, wherein the linear actuator assembly laterally displaces the second pedal between a first position in which the second pedal is disposed proximate to the first pedal, and a second position in which the second pedal is disposed further away from the first pedal than the first position, and wherein the linear actuator assembly comprises:

a lead screw extending between a first sidewall and a second sidewall of a footwell in which the pedal assembly is disposed, a clevis bracket operably coupling the second pedal arm to the brake assembly, and a motor operably coupled to the lead screw to rotate the lead screw.

2. The pedal assembly of claim 1, wherein the lead screw comprises a thread assembly and the clevis bracket is in threaded engagement with the thread assembly.

3. The pedal assembly of claim 2, wherein responsive to the motor rotating the lead screw, the clevis bracket is displaced along the lead screw and carries the second pedal between the first position and the second position.

4. The pedal assembly of claim 3, wherein the brake assembly comprises a piston, a cylinder and a fluid line operably coupled to the second pedal via the clevis bracket, and wherein responsive to the motor rotating the lead screw, the clevis bracket carries the piston, the cylinder and the fluid line with the second pedal between the first position and the second position.

5. The pedal assembly of claim 3, wherein in the first position, the clevis bracket is disposed at a first end of the thread assembly, and in the second position, the clevis bracket is disposed at a second end of the thread assembly.

6. A pedal assembly for providing operational inputs to a vehicle, the pedal assembly comprising:

a first actuation assembly operably coupled to a powertrain of the vehicle; and a second actuation assembly operably coupled to a brake assembly of the vehicle, wherein the first actuation assembly comprises a first engagement portion having a first surface area, wherein the second actuation assembly comprises a second engagement portion having a second surface area, wherein the second actuation assembly is configurable in a first state and a second state, and wherein the second state surface area is larger than the first state surface area.

7. The pedal assembly of claim 6, wherein the first actuation assembly comprises a first pedal and the first engagement portion comprises a first pedal pad operably coupled to the first pedal, and wherein the second actuation assembly comprises a second pedal and the second engagement portion comprises a second pedal pad operably coupled to the second pedal.

8. The pedal assembly of claim 7, wherein the second pedal pad comprises a pivot portion and a base portion, wherein the pivot portion is rotatably operably coupled to the base portion, wherein the pivot portion is rotatable relative to the base portion between a closed position and an open position, and wherein the closed position corresponds to the first state and the open position corresponds to the second state.

9. The pedal assembly of claim 8, wherein the pivot portion has a same shape as the base portion and a same area as the base portion.

10. The pedal assembly of claim 8, wherein the pivot portion is operably coupled to the base portion at a hinge disposed at a distal edge of the second pedal pad from the first pedal, and wherein the hinge comprises a fastener axially aligned along a first pivot axis extending parallel to the distal edge of the second pedal pad.

11. The pedal assembly of claim 10, wherein the pivot portion is rotatable relative to the base portion responsive to loosening the fastener, and wherein the pivot portion is fixed relative to the base portion responsive to tightening the fastener.

12. The pedal assembly of claim 7, wherein the second actuation assembly further comprises a third pedal and the second engagement portion further comprises a third pedal pad operably coupled to the third pedal, wherein the second engagement portion comprises the second pedal pad and the third pedal pad, and wherein the third pedal is disposed on an opposite side of the second pedal from the first pedal and is operably coupled to the brake assembly of the vehicle.

13. The pedal assembly of claim 12, wherein the third pedal is rotatable between a deployed position and a stowed position, wherein the stowed position corresponds to the first state and the deployed position corresponds to the second state, and wherein the third pedal is operable in lieu of the second pedal to provide the operational inputs to the brake assembly while in the second state.

14. The pedal assembly of claim 12, wherein the third pedal further comprises a third pedal arm comprising:

a lower arm portion operably coupled to the third pedal pad;

an upper arm portion operably coupled to the brake assembly; and a knuckle joint rotatably operably coupling the lower arm portion to the upper arm portion.

15. The pedal assembly of claim 14, wherein the lower arm portion is rotatable about the knuckle joint between the deployed position and the stowed position, wherein in the stowed position, the lower arm portion is disposed proximate to the upper arm portion and above a footwell in which the pedal assembly is disposed, and wherein in the deployed position, the lower arm portion extends away from the upper arm portion into the footwell.

16. The pedal assembly of claim 15, wherein the upper arm portion comprises a rotational stop that, in the deployed position, is in contact with the lower arm portion, and wherein the rotational stop defines an angular orientation of the lower arm portion in the deployed position and enables the lower arm portion and the upper arm portion to move together responsive to receiving an input force.

17. The pedal assembly of claim 6, wherein the first actuation assembly comprises a first pedal and the first engagement portion comprises a first pedal pad operably coupled to the first pedal, wherein the second actuation assembly comprises a second pedal and the second engagement portion comprises a second pedal pad operably coupled to the second pedal, and wherein a pedal pad attachment is removably operably coupleable to the second pedal pad.

18. The pedal assembly of claim 17, wherein the first state corresponds to the pedal pad attachment being removed from the second pedal pad, and wherein the second state corresponds to the pedal pad attachment being operably coupled to the second pedal pad.

19. The pedal assembly of claim 17, wherein the pedal assembly comprises a coupling assembly to operably couple the pedal pad attachment to the second pedal pad, the coupling assembly comprising:

a first plurality of receiving orifices disposed at the second pedal pad; and a second plurality of receiving orifices disposed at the pedal pad attachment, wherein the first plurality of receiving orifices is operably coupleable to the second plurality of receiving orifices in a unidirectional orientation via a plurality of fasteners, and wherein the pedal pad attachment extends away from the first pedal in the unidirectional orientation.

* * * * *